(12) United States Patent
Levitt

(10) Patent No.: US 12,248,954 B2
(45) Date of Patent: Mar. 11, 2025

(54) SYSTEMS FOR MANAGING CONSUMER RESEARCH

(71) Applicant: Brass Flowers Inc., Tucson, AZ (US)

(72) Inventor: Deborah Levitt, Tuscon, AZ (US)

( * ) Notice: Subject to any disclaimer, the term of this patent is extended or adjusted under 35 U.S.C. 154(b) by 262 days.

(21) Appl. No.: 17/677,793

(22) Filed: Feb. 22, 2022

(65) Prior Publication Data

US 2023/0267485 A1     Aug. 24, 2023

(51) Int. Cl.
*G06Q 30/0203* (2023.01)
*G06Q 10/109* (2023.01)
*G06Q 10/1093* (2023.01)

(52) U.S. Cl.
CPC ..... *G06Q 30/0203* (2013.01); *G06Q 10/1095* (2013.01)

(58) Field of Classification Search
None
See application file for complete search history.

(56) References Cited

U.S. PATENT DOCUMENTS

| | | | |
|---|---|---|---|
| 7,251,609 B1 * | 7/2007 | McAlindon | G16H 10/20 707/999.009 |
| 9,606,694 B2 | 3/2017 | Torbey et al. | |
| 10,515,377 B1 | 12/2019 | Manber | |
| 11,017,416 B2 * | 5/2021 | Kopikare | G06Q 10/1095 |
| 11,328,796 B1 * | 5/2022 | Jain | G16H 10/20 |
| 11,664,099 B1 * | 5/2023 | Jain | G16H 40/67 705/2 |
| 11,736,564 B1 * | 8/2023 | Jain | H04L 63/20 709/203 |
| 11,763,919 B1 * | 9/2023 | Jain | G16H 10/20 715/221 |
| 2008/0109455 A1 * | 5/2008 | Katz | G06Q 10/06393 |
| 2011/0231483 A1 * | 9/2011 | Derraugh | G06F 16/29 709/203 |
| 2013/0055095 A1 * | 2/2013 | Kavanagh | G06F 16/903 715/738 |
| 2014/0358636 A1 * | 12/2014 | Nowak | G06Q 50/01 705/7.32 |

(Continued)

FOREIGN PATENT DOCUMENTS

WO    WO-2020159665 A1 *  8/2020  .......... G06F 11/3438

OTHER PUBLICATIONS

F. Ahmed, L. F. Capretz and A. Jaffar, "The Business of Software Product Family: An Empirical Survey," 2008 International Conference on Computer Science and Information Technology, Singapore, 2008, pp. 745-749 (Year: 2008).*

*Primary Examiner* — Jerry O'Connor
*Assistant Examiner* — Philip N Warner
(74) *Attorney, Agent, or Firm* — MINK

(57) ABSTRACT

A system for managing consumer research may include a processing server, a collaboration server, and a scheduling server. The processing server, the collaboration server, and/ or the scheduling server may be instantiated on a cloud-based processing device. The system may include various databases, include a respondent database, a segment database, and/or a document database. The system may include virtual dashboards for a researcher conducting a research study, a virtual dashboard for a research subject participating in the research study, and/or a virtual dashboard for a customer that requests the research study.

17 Claims, 15 Drawing Sheets

(56) References Cited

U.S. PATENT DOCUMENTS

| | | | |
|---|---|---|---|
| 2016/0189179 A1* | 6/2016 | Simmons | G06Q 50/01 |
| | | | 705/7.32 |
| 2017/0235848 A1* | 8/2017 | Van Dusen | G06Q 10/101 |
| | | | 705/12 |
| 2017/0255964 A1 | 9/2017 | Hendricks | |
| 2017/0278117 A1 | 9/2017 | Wallace et al. | |
| 2017/0352048 A1* | 12/2017 | Richardson | G06F 7/08 |
| 2018/0077092 A1* | 3/2018 | Jalil | G06Q 10/101 |
| 2019/0347678 A1* | 11/2019 | Eggers | G06Q 30/0203 |
| 2019/0369856 A1 | 12/2019 | Torbey et al. | |
| 2020/0147038 A1* | 5/2020 | Russ | A61K 31/65 |
| 2020/0160259 A1 | 5/2020 | Paris, Jr. | |
| 2020/0228424 A1* | 7/2020 | Reilly | H04L 43/028 |
| 2021/0090097 A1* | 3/2021 | Froman | G06Q 30/0201 |
| 2021/0090138 A1* | 3/2021 | Mestres | G06F 11/3688 |
| 2021/0407312 A1* | 12/2021 | Mestres | H04L 65/1076 |
| 2023/0039338 A1* | 2/2023 | Udupa | G06F 3/0484 |

\* cited by examiner

Figure 3A:
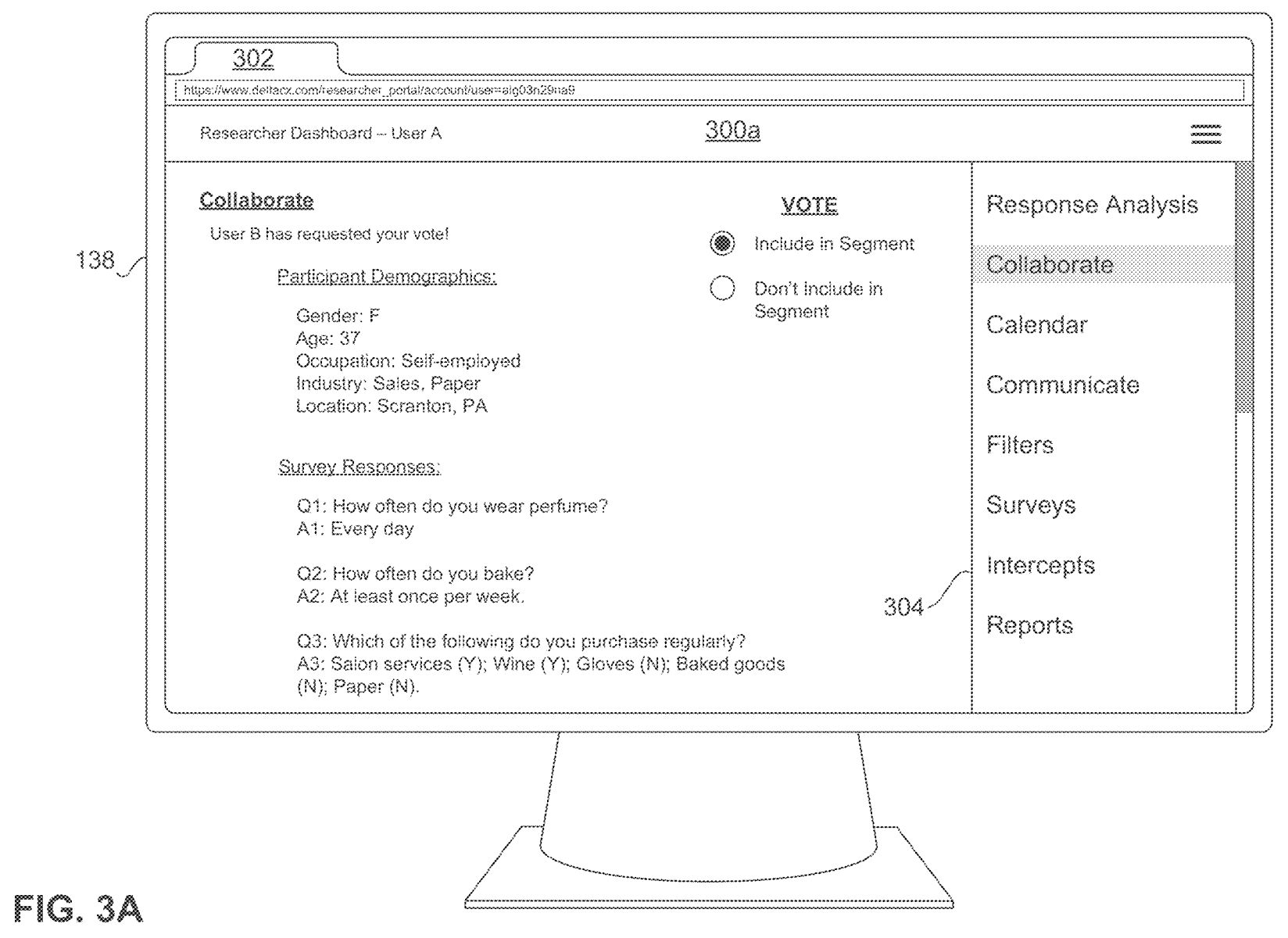

Collaborate

User B has requested your vote!

Participant Demographics:

Gender: F
Age: 37
Occupation: Self-employed
Industry: Sales, Paper
Location: Scranton, PA

Survey Responses:

Q1: How often do you wear perfume?
A1: Every day

Q2: How often do you bake?
A2: At least once per week.

Q3: Which of the following do you purchase regularly?
A3: Salon services (Y); Wine (Y); Gloves (N); Baked goods (N); Paper (N).

VOTE
- Include in Segment
- Don't include in Segment

Response Analysis
- Collaborate
- Calendar
- Communicate
- Filters
- Surveys
- Intercepts
- Reports

SYSTEMS FOR MANAGING CONSUMER RESEARCH

BACKGROUND

Companies, academic institutions, laboratories, business consultants, and others ("companies") plan and execute research studies to obtain insights into potential and current concepts, designs, products, services, customers, users, patients, partners, and other individuals and groups with whom there might be interactions. The research may have goals including but not limited to identifying target audiences; understanding potential and current target audiences; understanding individuals' and groups' likely behaviors, needs, tasks, preferences, motivations, and experiences, and evaluating the usability, desirability, and other factors of concepts, products, and services. Insights from research may enable companies to develop and improve messaging, marketing, advertising, products, services, strategic business direction, company goals, and other initiatives. Such research might be generative, evaluative, exploratory, quantitative, qualitative, or a combination of these. Research may be conducted through observations; interviews; group or individual conversations such as focus groups; surveys; asking participants to journal or diary their activities; testing designed or prototyped concepts; previewing concepts or models; and other methods through which information and data are obtained directly from people. Such research may relate to human senses, such as what people eat, drink, hear, see, say, touch, as well as changes that might occur from ingesting or interacting with medicines, drugs, or other substances. Potential participants in a study may be recruited. Such participants may be found, collected, catalogued, quantified, qualified, considered, and then included or excluded from the study.

BRIEF DESCRIPTION OF THE DRAWINGS

The present description will be understood more fully when viewed in conjunction with the accompanying drawings of various examples of systems for managing consumer research. The description is not meant to limit the systems for managing consumer research to the specific examples. Rather, the specific examples depicted and described are provided for explanation and understanding of systems for managing consumer research. Throughout the description the drawings may be referred to as drawings, figures, and/or FIGs.

FIG. 3A illustrates a researcher virtual dashboard being displayed on a personal computer, according to an embodiment.

FIG. 17 illustrates an example output of the research study system, according to an embodiment.

DETAILED DESCRIPTION

Figure 1:
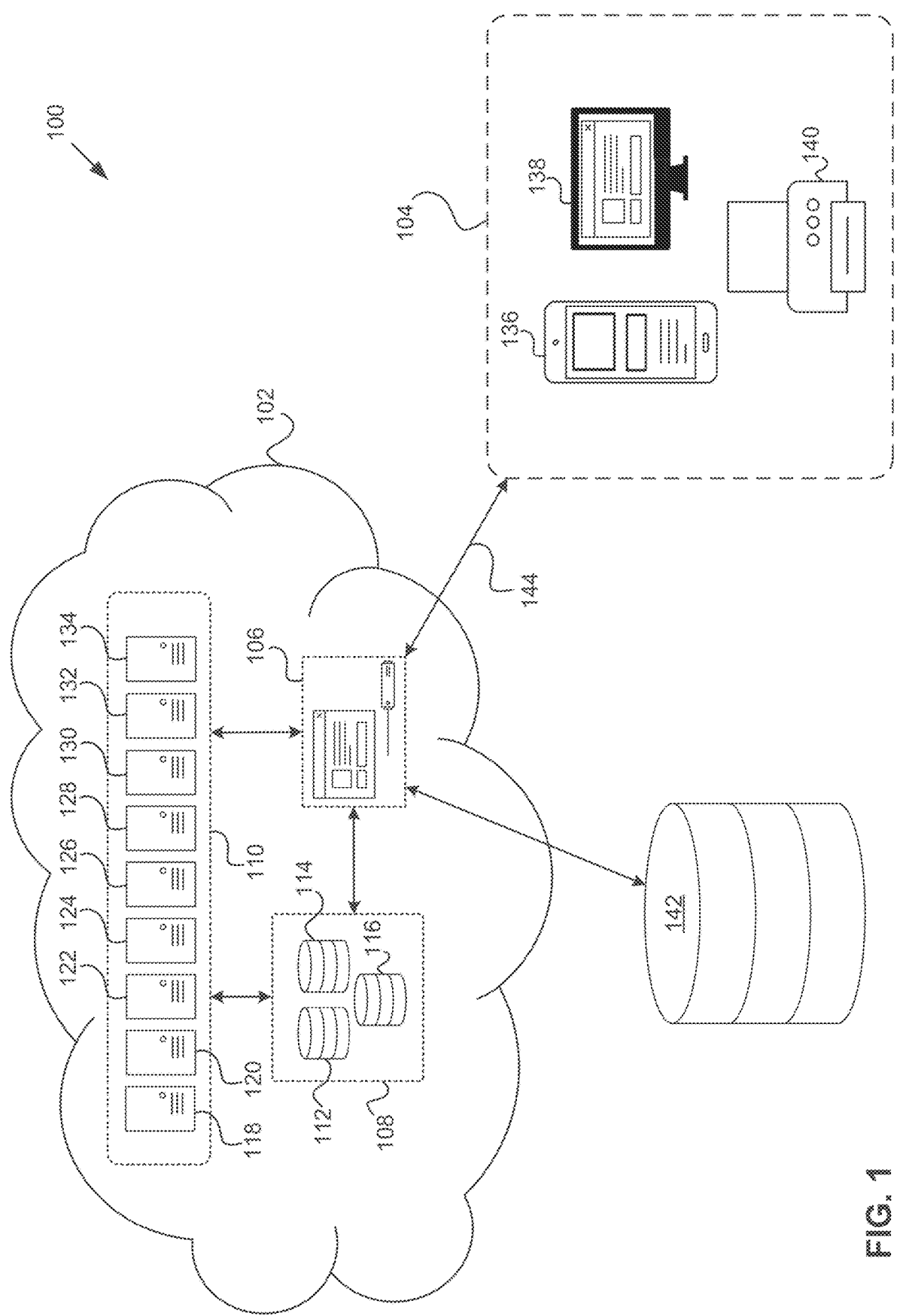
FIG. 1 illustrates a first research study system, according to an embodiment.

Systems for managing consumer research as disclosed herein will become better understood through a review of the following detailed description in conjunction with the figures. The detailed description and figures provide merely examples of the various embodiments of systems for managing consumer research. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

A conventional research tool may include a data table that shows rows of information associated with an individual that participated in a study. The data table may include columns for information about the individual, including demographic information and study response information. The study response information may be responses by the participant to questions on a form or may be responses obtained from the participant by an interviewer. The data table may be unstructured, i.e. may include cells with entries that do not correspond to pre-defined entries for the cells. The information in the data table may be manipulated in a variety of ways according to the tools available in the spreadsheet software used to view the data table. Another conventional research tool may include tools for: creating incentives for consumers to participate in a study; generating screeners and intercepts to identify study participants; and obtaining schedule information from potential participants to schedule appointments with the participants.

Conventional research tools have several drawbacks. For example, using the unstructured data table to identify study participants to target for further study may be laborious. A researcher may have to manually sort and/or filter the data table. When the data table includes unstructured data for hundreds or even thousands of participants, this task can become so time-consuming as to be impractical. Researchers may thus lose information and insight into the participants by having to resort to shortcuts in handling the unstructured data.

Communicating with participants may also be a challenge. A researcher may have to resort to a third-party messaging system that is disconnected from the information about the participants. Participant contact information may have to be manually added to the third-party messaging system. Even if participant contact information can be imported to the third-party messaging system, the contact information is segregated from the other information about the participant. Insight may be lost because messages with the participant are not connected to the other information about the participant. When communicating with hundreds of participants, it may be challenging for a researcher to keep track of which communication corresponds to which participant in which study.

Another drawback of conventional research tools is the difficulty for researchers to collaborate. Input by various researchers may be recorded in messages between the researchers but may be disconnected from the data table. This may cause confusion between the researchers. Additionally, some input by researchers may be lost in the plethora of messages that accumulate as the researchers collaborate. The study may be deficient because the researchers are not able to effectively collaborate.

A further drawback of conventional research tools is confusion in scheduling. A participant may be prompted to select appointments that are convenient for the participant. The appointments selected by the participant may be disconnected from the researchers' schedules. The participant may be assigned to an available researcher based on which researcher is available during the times selected by the participant. Researchers may not have the flexibility to decide which researcher interviews the participant. The researchers may not have the flexibility to decide how many appointments are scheduled for the researchers. The participants may not have the flexibility to choose which researcher the participant meets with.

Yet another drawback of conventional research tools is the information available to participants. Participants may have to use various modes of communication, such as phone, text, and email, to keep track of information about studies the participants have participated in. For example, a participant may have to search their email records to find information about appointments and payment for participating in a study. The difficulty in managing information may discourage potential participants from engaging in a study.

Implementations described herein below of systems for managing consumer research may address some or all of the problems described above. A system for managing consumer research may include a processing server, a collaboration server, and a scheduling server. The processing server, the collaboration server, and/or the scheduling server may be instantiated on a cloud-based processing device. The system may include virtual dashboards for a researcher conducting a research study, a participant in the research study, and/or a customer that requests the research study.

The processing server may be configured to receive survey response data and store the survey response data in a response database that corresponds to a pool of survey responses by a pool of participants. The processing server may be configured to receive rubric data that corresponds to a rubric for scoring answers in the survey response data. The processing server may be configured to score respondent data in the response database using the rubric data. The processing server may be configured to store the scored response data. The processing server may be configured to receive filtering response data that corresponds to a minimum score for advancing an individual participant in the research study. The processing server may be configured to store, in a segment database, respondent data that corresponds to scored response data that satisfies the filtering response data. The processing server may be configured to output respondent data to the virtual dashboard.

The collaboration server may be configured to receive vote data that corresponds to votes on whether to include an individual participant in the segment database. The collaboration server may be configured to output, to the processing server, the vote data. The processing server may be configured to combine the vote data with the filtering response data or the score data in determining whether to include the individual participant in the segment database. The processing server may be configured to override the filtering response data with the vote data in determining whether to include the individual participant in the segment database. The processing server may be configured to exclude the individual participant from the segment database when the vote data indicates the individual participant should not be included in the segment database. The processing server may be configured to include the individual participant in the segment database when the vote data indicates the individual participant should be included in the segment database.

The scheduling server may be configured to receive meeting goal data that corresponds to a goal for a number of meetings to actually hold with potential participants for the research study. The scheduling server may be configured to determine, based on the meeting goal data, schedule goal data that corresponds to a number of meetings to schedule with the potential participants. The scheduling server may be configured to determine, based on the schedule goal data, invite data that corresponds to a number of the potential participants to invite to participate in the research study. The scheduling server may be configured to output, to a potential participant device and based on the invite data, invitation data that corresponds to an invitation for an individual potential participant to schedule an appointment with an individual researcher.

The systems for managing customer research described herein may streamline the research study and enable researchers to gain deeper insights for the customer requesting the research study. The systems may enable direct collaboration by various researchers while avoiding the confusion caused by collaboration via messaging. Researchers may be able to directly view participant information to vote on whether to advance the participant in the research study. This allows for insight that may not be captured by other researchers. Additionally, researchers may better be able to target which researcher interviews which participant. The system may also automatically ensure enough appointments are scheduled to reach a goal set by the researchers. This may decrease the amount of time required for the study and increase participation. The system may automate tedious and/or error-prone tasks, unify workflow so that various separate tools are obviated, improve efficiency, reduce errors, improve communication, improve participant and/or researcher experience, and/or enable faster and simpler selection of participants that best match research goals.

Furthermore, the various dashboards may provide centralized communication and information for the various stakeholders in the research study. Researchers may be able to view study information, communicate with participants, and collaborate insightfully because all the information needed by the researchers is at the researchers' fingertips. Participants may be able to quickly and easily view appointments, past study participation, and payment information, which may incentivize greater study participation. Customers may be able to view real-time results of the research study and more accurately budget for the research study based on the real-time information.

As used herein, research subject, participant, and/or respondent may be used to refer to an individual that is potentially or currently being studied as part of a research study, or who has previously been studied as part of a research study. Responses by the individual to questions may be analyzed as part of the research study, information about the individual may be analyzed as part of the research study, and so forth. Researcher may refer to an individual conducting the research study, coordinating the research study, administrating the research study, administering the research study, managing the research study, and/or managing a research team. A researcher may, for example, generate survey questions, analyze respondent data, interview participants, and so forth. Customer may refer to an individual and/or entity requesting the research study. In at least some cases the researcher may be an employee of the customer or the researcher and the customer may be the same individual and/or entity. User may refer to an individual that utilizes one or more of the systems, devices, servers, and/or dashboards described herein.

Further as used herein, collaborator may refer to an individual that works with a researcher but does not per se conduct a research study such as a team leader, a manager, a co-worker, a note-taker, an administrator, a secretary, an assistant, a research sponsor, a customer, a client, and so forth. Tool may refer to one or more systems or methods used by a researcher, collaborator, and/or participant to plan, execute, and/or analyze one or more tasks as part of a research study. Dashboard may refer to a physical or digital interface, screen, or page that provides information in a visual format.

FIG. 1 illustrates a first research study system 100, according to an embodiment. The first research study system 100 may streamline researcher efforts and collaboration in a research study by centralizing respondent data, communication, scheduling, and collaboration. The first research study system 100 may decrease an amount of time from when the study was requested to when the study is completed. The first research study system 100 may enable the various stakeholders in the research study to view the results of the study in real-time. The first research study system 100 may enable various stakeholders in the research study to view information related to management of the study, such as who was invited for an appointment, whether the invited individual has signed legal forms, whether the invited individual has made an appointment, whether the invited individual showed up for their appointment, and so forth.

The first research study system 100 may include a cloud-based processing device 102 and a user device 104. The cloud-based processing device 102 may include an application server 106, a database suite 108, and a server suite 110. The first research study system 100 may be cloud-based, with the database suite 108, the server suite 110, and/or the application server 106 hosted on a cloud hosting platform accessible by the user device 104 via the internet. The first research study system 100 may be implemented as an intranet system. The first research study system 100 may be implemented as an extranet system.

The database suite 108 may include distinct databases such as a response database 112, a segment database 114, a document database 116, and so forth. The server suite 110 may include distinct servers such as a processing server 118, a collaboration server 120, a scheduling server 122, a document server 124, a payment server 126, a communication server 128, a survey server 130, a filtering server 132, and/or an intercept server 134. The elements of the server suite 110 may be instantiated on the cloud-based processing device 102 (e.g. may be installed on and/or operate on the cloud-based processing device 102).

The user device may include one or more devices for communicating with users of the first research study system 100, such as a smartphone 136, a personal computer 138, and/or a printer 140. The first research study system 100 may include an external database 142.

The user device 104 may be communicatively coupled with the cloud-based processing device 102 by a communication link 144. The external database 142 may be communicatively coupled with the cloud-based processing device 102 by the communication link 144. For example, the user device 104 or the external database 142 may communicate with the application server 106 via the communication link 144. The communication link 144 may be a direct communication link or an indirect communication link.

A direct link may include a link between two devices where information is communicated from one device to the other without passing through an intermediary. For example, the direct link may include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 144, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a satellite network, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 144, may refer to any of the aforementioned indirect communication links.

Various of the elements of the first research study system 100 may include data storage and/or processing capabilities. Such capabilities may be rendered by various electronics for processing and/or storing electronic signals. One or more of the devices in the first research study system 100 may include a processing device. For example, the cloud-based processing device 102, the user device 104, the smartphone 136, the personal computer 138, the printer 140, and/or the external database 142 may include the processing device. One or more of the devices in the first research study system 100 may include a memory device. For example, the cloud-based processing device 102, the user device 104, the smartphone 136, the personal computer 138, the printer 140, and/or the external database 142 may include the memory device.

The processing device may have non-transitory and/or transitory memory. The memory device may have non-transitory and/or transitory memory. The processing device may have volatile memory and the memory device may have non-volatile memory. The processing device may generate an output based on an input. For example, the processing device may receive an electronic and/or digital signal. The processing device may send the signal to the memory device, and the memory device may store associated with the signal. The processing device may read the signal and perform one or more tasks with the signal, such as performing various functions with data in response to input received by the processing device. The processing device may read from the memory device information needed to perform the functions. For example, the processing device may make a recommendation based on a received input and a rule stored on the memory device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various of the devices in the first research study system 100 may include data communication capabilities. Such capabilities may be rendered by various electronics for transmitting and/or receiving electronic and/or electromagnetic signals. One or more of the devices in the first research study system 100 may include a communication device. For example, the cloud-based processing device 102, the user device 104, the smartphone 136, the personal computer 138, the printer 140, and/or the external database 142 may include the communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wifi and/or cellular network. As used herein, "communication device" "communication component," and/or "communication unit" may be used generically herein to refer to any or all of the aforementioned elements and/or features of the communication component.

Various of the elements in the first research study system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system that receives, retrieves, stores, outputs, and/or processes data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

Figure 2:
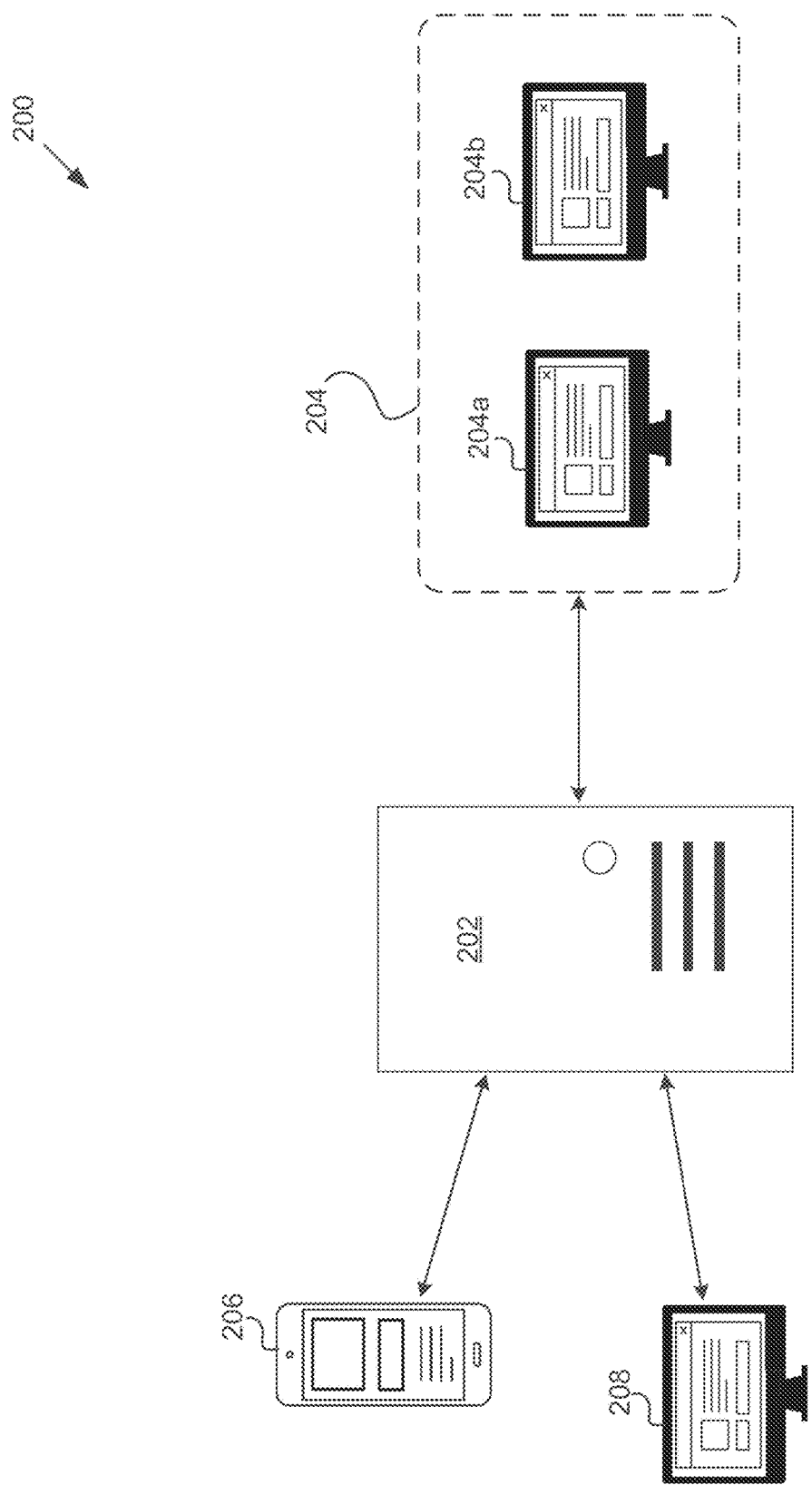
FIG. 2 illustrates a second research study system with a local server device, according to an embodiment.

FIG. 2 illustrates a second research study system 200 with a local server device 202, according to an embodiment. The second research study system 200 may be downloadable and/or hosted locally. This may provide additional security in running studies where data privacy is an important concern. This may enable a customer and/or research organization to have greater control over the physical location of data associated with the study. This may also enable offline interaction with study data, study participants, and/or other researchers, where offline may refer to the system being disconnected from a public network. The system may be connected to a private and/or closed network.

The local server device 202 may include various of the elements of the cloud-based processing device 102, such as the application server 106, the database suite 108, and/or the server suite 110. For example, the elements of the server suite 110 may be instantiated on the local server device 202. The second research study system 200 may further include a researcher device 204, a participant device 206, and/or a customer device 208. The researcher device 204 may include a first user device 204a that operates a first instance of a researcher virtual dashboard and a second user device 204b that operates a second instance of the researcher virtual dashboard (e.g. the first user device 204a may be a first researcher's device and the second user device 204b may be a second researcher's device). The elements of the second research study system 200 may communicate via the communication link 144.

The elements of the second research study system 200 may be networked via a private network that is not publicly accessible (i.e. data on the private network is protected by one or more authentication means). Various of the elements of the second research study system 200 may be networked via a public network. For example, the researcher device 204 may be networked to the local server device 202 via a local network connection and participant device 206 may be networked to the local server device 202 via a public network connection. The participant device 206 may submit authentication information to access the local server device 202.

FIG. 3A illustrates a researcher virtual dashboard 300a being displayed on the personal computer 138, according to an embodiment. The researcher virtual dashboard 300a may provide a centralized interface for researchers to perform the research study and engage with the elements of the research study system (e.g. the first research study system 100 and/or the second research study system 200). The researcher may communicate with the customer, study participants, another researcher, and/or a collaborator. The researcher may manipulate respondent data, schedule appointments with study participants, and narrow a pool of respondents to a segment for further inclusion in the research study.

The researcher virtual dashboard 300a may be implemented on the personal computer 138 via a web browser 302. The researcher virtual dashboard 300a may be implemented on the personal computer 138 via an application installed on the personal computer 138. The researcher virtual dashboard 300a may display various tools 304 that may enable the researcher to interact with the various elements of the research study system (e.g. the first research study system 100 and/or the second research study system 200). The researcher virtual dashboard 300a may be a client application that communicates directly with an application server in the research study system (e.g. the application server 106).

Other virtual dashboards for other users (e.g. other researcher, participants, and/or customers) may be similarly implemented to the researcher virtual dashboard 300a. The other virtual dashboards may have the same or different functionality. For example, another instance of the researcher virtual dashboard 300a running on a device associated with another researcher may include limitations on functionality relative to a particular study and may have full permissions for another study run by the other researcher. A customer virtual dashboard may include a communication tool and a tool for viewing respondent data but may not include a scheduling tool.

Figure 3B:
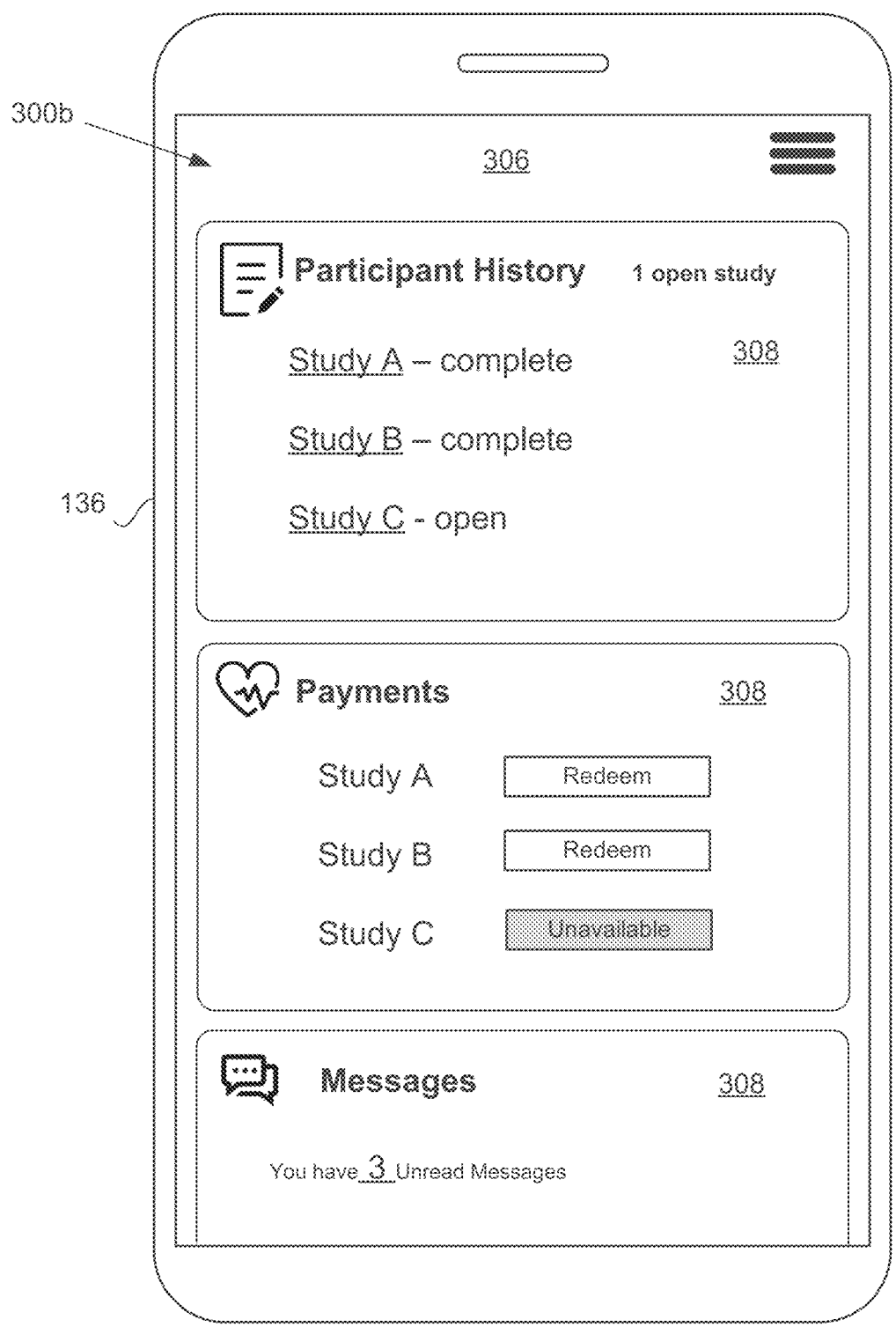
FIG. 3B illustrates a participant virtual dashboard being displayed on the smartphone, according to an embodiment.

FIG. 3B illustrates a participant virtual dashboard 300b being displayed on the smartphone 136, according to an embodiment. The participant virtual dashboard 300b may provide a centralized location for a participant (i.e. a subject of the research study) to communicate with researchers, interact with legal documents and other paperwork, respond to additional surveys and questions, view participation history, view payment status, redeem payment, and opt in or out of communication for future studies with a particular company. This ease of participation enabled by the participant virtual dashboard 300b may entice greater participation in the research study. The number of process steps performed by researchers may also be greatly reduced.

The participant virtual dashboard 300b may be implemented on the smartphone 136 as an application 306 installed on the smartphone 136. The participant virtual dashboard 300b may be implemented on the smartphone 136 via a web browser. The participant virtual dashboard 300b may display various participant tools 308 that may enable the participant to interact with various elements of the research study system (e.g. the first research study system 100 and/or the second research study system 200). The participant tools 308 may be tailored for the participant. For example, the participant tools 308 may enable the participant to communicate with researchers, view, redeem and/or receive payment for participation in the research study, and/or view participation history regarding a current study and/or a past study. The participant virtual dashboard 300b may be a client application that communicates directly with an application server in the research study system (e.g. the application server 106).

Other virtual dashboards for other users (e.g. other participants, researchers, and/or customers) may be similarly implemented to the participant virtual dashboard 300b. The other virtual dashboards may have the same or different functionality corresponding to interaction relevant for the particular user. For example, the researcher virtual dashboard 300a, as implemented on the smartphone 136, may additionally include the ability to collaborate with other researchers and/or collaborators. The researcher virtual dashboard 300a, as implemented on the smartphone 136, may include the ability to manipulate respondent data.

Various features and/or elements of the systems, devices, servers, and/or dashboards described above may be implemented and/or utilized for the methods described below. The systems, devices, servers, and/or dashboards may be configured to implement various of the methods described below (i.e. may include programming logic for executing various elements of the methods). For example, a method described below may be implemented by one or more elements of the server suite 110 on the cloud-based processing device 102. As another example, a method described below may be implemented using the elements of the first research study system 100 and/or the second research study system 200. The cloud-based processing device 102 and/or the local server device 202 may be configured to implement various elements of the methods described below. Additionally, various elements of the server suite 110 and/or the database suite may be configured to implement various elements of the methods described below.

Figure 4:
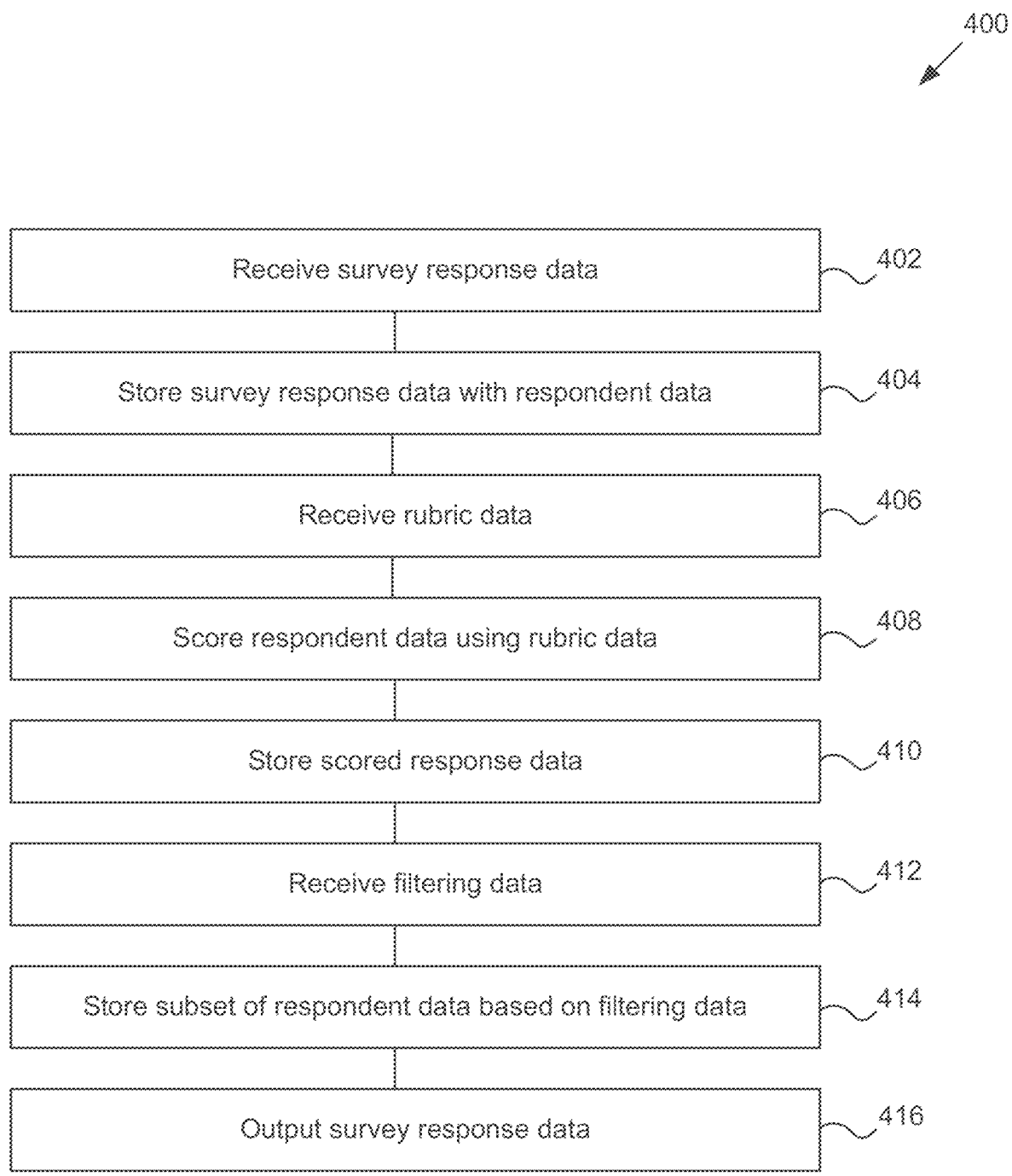
FIG. 4 illustrates a method of filtering respondent data into a segment database, according to an embodiment.

FIG. 4 illustrates a method 400 of filtering respondent data into a segment database, according to an embodiment. An initial survey as part of the research study may generate respondent data that corresponds to a pool of respondents that respond to the initial survey. The respondent data may be culled from two or more surveys. A portion of the respondent data may be automatically collected from data corresponding to the initial survey. A portion of the respondent data may be automatically collected. A portion of the respondent data may be manually collected. A portion of the respondent data may be generated from the initial survey and another portion of the respondent data may be generated from previously-collected data. A researcher may want to identify potential participants from the pool of respondents for a further appointment and/or study as part of the research study. The method 400 may enable a researcher to automatically select potential participants for further study. The method 400 may enable a researcher to improve processes, efficiency, and accuracy when conducting the research study.

The method 400 may be implemented by a processing server (e.g. the processing server 118) configured to implement the method 400. The method 400 may include receiving survey response data that corresponds to an answer by an individual participant to an individual survey question (block 402). The survey response data may be received from a first instance of a researcher virtual dashboard (e.g. the researcher virtual dashboard 300a) running on a first researcher device (e.g. the first user device 204a). The survey response data may be received from a participant virtual dashboard (e.g. the participant virtual dashboard 300b) running on a participant device (e.g. the user device 104). The participant device may be associated with the individual participant that provided the answer to the individual survey question. The survey response data may be received from a customer virtual dashboard running on a customer device (e.g. the user device 104). The customer device may be associated with a customer that has requested the research study.

The individual survey question may be an initial and/or screener survey question to identify potential participants in the research study. The individual survey question may be one among several survey questions. The individual survey question may be part of a secondary survey to narrow a pool of respondents to a segment of the pool for further study. The individual survey question may be part of a secondary survey to add data about the participant to the response database. The survey response data may include answers to survey questions. The survey response data may include demographic information about the participant.

The survey response data may be imported or transferred from another database (e.g. the external database 142). The survey response data may be imported by a researcher via the researcher virtual database. The survey response data may be received as potential participants and/or current participants in the research study answer the survey questions. For example, the participant may answer questions in the participant virtual dashboard. The survey response data may be received via a form at a uniform resource locator (URL) address. When the participant completes the form, the form may send the survey response data to the processing server. The survey response data may be received at the processing server via an application server (e.g. the application server 106) that mediates communication between the processing server and other resources and/or devices.

The method 400 may include storing, in a response database, the survey response data as part of respondent data (block 404). The respondent data may correspond to a pool of survey responses by a pool of participants. Each individual respondent in the pool of participants may be associated with individual survey response data (i.e. demographic information about the individual, survey answers by the individual, and so forth). The pool of participants may include potential study participants that provided survey response data gathered in response to a screener questionnaire. The pool of participants may be a segment of respondents narrowed from a broader pool of respondents to a screener questionnaire. The pool of research participants may be a segment of respondents narrowed from a broader pool due to information collected by researchers who are in direct communication with participants, separate and outside of any survey responses. The pool of participants may be segmented using a sorting tool or a filtering tool applied to the broader pool of respondents (e.g. the tool may be applied to an initial pool of respondent data).

The respondent data may include notes, tags, markings, flags, categorizations, and/or other data input by a researcher about the participant. Such data may not be input directly by the participant, but rather may be input by the researcher. Such data may be automatically added to the respondent data by polling another database with information about a particular participant. For example, the participant may have participated in another study. Information about the participant may be stored in a database associated with the other study. Notes, tags, markings, flags, categorizations, and/or other data associated with the participant and the other study may be integrated with the respondent data for the current study.

The method 400 may include receiving rubric data that corresponds to a rubric for scoring the answer to the individual survey question by the individual participant (block 406). The rubric data may be received from the customer virtual dashboard. For example, the customer may desire, as part of the research study, to identify individuals who prefer apples or oranges. The survey may ask the participant whether the participant prefers apples, oranges, bananas, or grapes. The rubric data may indicate that responses indicating apples or oranges as the preferred fruit are scored positively and responses indicating bananas or grapes are scored neutrally or negatively. The researcher may determine the rubric data. The rubric data may accordingly be received from the researcher virtual dashboard.

The rubric data may be generated and/or received before the response data is received. The rubric data may be generated based on a different survey and/or a response data set corresponding to the different survey. The rubric data may be generated and/or received as survey data is generated and/or received. For example, a researcher may cause, via the researcher dashboard, a set of survey questions and/or prompts to be created. The survey questions/prompts may be stored in a database as survey data. The rubric data may be generated and/or received as the survey data is generated and/or received. The rubric data may be generated and/or received after the survey data is generated and/or received and before the response data is received.

The method 400 may include scoring the respondent data using the rubric data (block 408). The respondent data may include the survey response data that corresponds to the participant. The respondent data may be scored to obtain scored response data. The scored response data may include scores for each of the respondents reflected in the respondent data, including the participant from whom the survey response data was obtained. The scores may indicate how relevant an individual respondent (e.g. the participant) is to the research study. Depending on the rubric data, a higher score may indicate the individual respondent is of higher interest in the research study. Depending on the rubric data, a lower score may indicate the individual is of less interest in the research study. As the researcher may customize the scoring, the opposite may apply. Depending on the rubric data, a higher score may indicate the individual respondent is of less interest in the research study. Depending on the rubric data, a lower score may indicate the individual is of higher interest in the research study.

The rubric data and/or scored response data may include a quantitative (e.g. numerical) score. For example, the scored response data may include a score in a range from −2 to +2. The rubric data and/or the scored response data may include a qualitative (e.g. non-numerical and/or descriptive) score. For example, the rubric data may include a sentiment analysis of the respondent data, such as through natural language processing and/or machine learning. The sentiment analysis may determine a mood or sentiment expressed in response to open-ended survey questions. A respondent with a particular mood or perspective as reflected by the sentiment analysis may be of greater interest in the research study. The scored response data may indicate the sentiment analysis using natural language, numerical scoring, and/or other scales and measurements.

The method 400 may include storing the scored response data (block 410). The scored response data may be stored in the response database. For example, the response database may include a relational database. An individual score associated with an individual respondent may be stored in the relation database such that the individual score is associated with the individual respondent and the other information stored in the response database about the individual respondent. The response database may include a non-relational database. As one example, the scored response data may be stored according to a key-value schema.

The method 400 may include receiving filtering response data (block 412). The filtering response data may correspond to a minimum score to advance the individual participant in the research study. The filtering response data may be received from a first instance of the researcher virtual dashboard (e.g. the researcher virtual dashboard 300a, which may be running on the first user device 204a). The filtering response data may be received from a second instance of the researcher virtual dashboard (e.g. the researcher virtual dashboard 300a, which may be running on the second user device 204b). For example, the first researcher may have initiated the research study using the research study system. The first researcher may desire to collaborate with the second researcher on the research study. The first researcher may grant access in the research study system for the second researcher to access the research study information via the second instance of the researcher virtual dashboard. In general, for various aspects and method elements related to a research study system, researchers may grant access to other researchers and collaborators to allow for collaboration with other individuals.

The method 400 may include storing, in a segment database, the survey response data (block 414). The survey response data may be stored in the segment database in response to the scored response data associated with the survey response data meeting or surpassing the minimum score. The segment database may be a subdatabase of the respondent database. The segment database may be a separate database from the respondent database. The segment database may store respondent data associated with those respondents that met or surpassed the minimum score set according to the filtering response data. The segment database may include a subset of the pool of survey responses in the respondent data corresponding to a subset of the pool of participants.

The method 400 may include outputting the survey response data (block 416). The survey response data may be output to the first instance of the researcher virtual dashboard. The survey response data may be output to the second instance of the researcher virtual dashboard. The survey response data may be output to the participant virtual dashboard. The survey response data may be output to the customer virtual dashboard. The survey response data may be updated, when stored in the segment database, to indicate the survey response data is stored in the segment database. When output, the survey response data may indicate to the user (e.g. the researcher, the participant, the customer, and so forth) that the survey response data is included in the segment database.

In various implementations, the research study system may enable a researcher to create a segment from a set of survey respondents based on a selected profile for the segment. The profile for the segment may determine the number and/or percentage of respondents having selected characteristics to include in the segment. The characteristics may, for example, include gender, age, location, occupation, race, ethnicity, a preference indicated in the survey response data, and so forth. The profile for the segment may indicate the segment should include a percentage of men, a percentage of women, a percentage of respondents in a first age bracket, a percentage of respondents in a second age bracket, a percentage of respondents in a first region, a percentage of respondents in a second region, and so forth. For example, the profile may indicate the segment should be fifty percent male and fifty percent female, that twenty percent of respondents in the segment should be in the age range from twenty-one to thirty, twenty percent of respondents in the segment should be in the age range from thirty-one to forty, twenty percent of respondents in the segment should be in the age range from forty-one to fifty, twenty percent of respondents in the segment should be in the age range from fifty-one to sixty, twenty percent of respondents should be in the over-sixty age range, that seventy percent of respondents in the segment should prefer object A over object B, and that thirty percent of respondents in the segment should prefer object B over object A. The foregoing example is provided for illustrative purposes, and is not intended to be limiting to the specific profile described.

The study system may automatically create a segment based on the profile.

Figure 5:
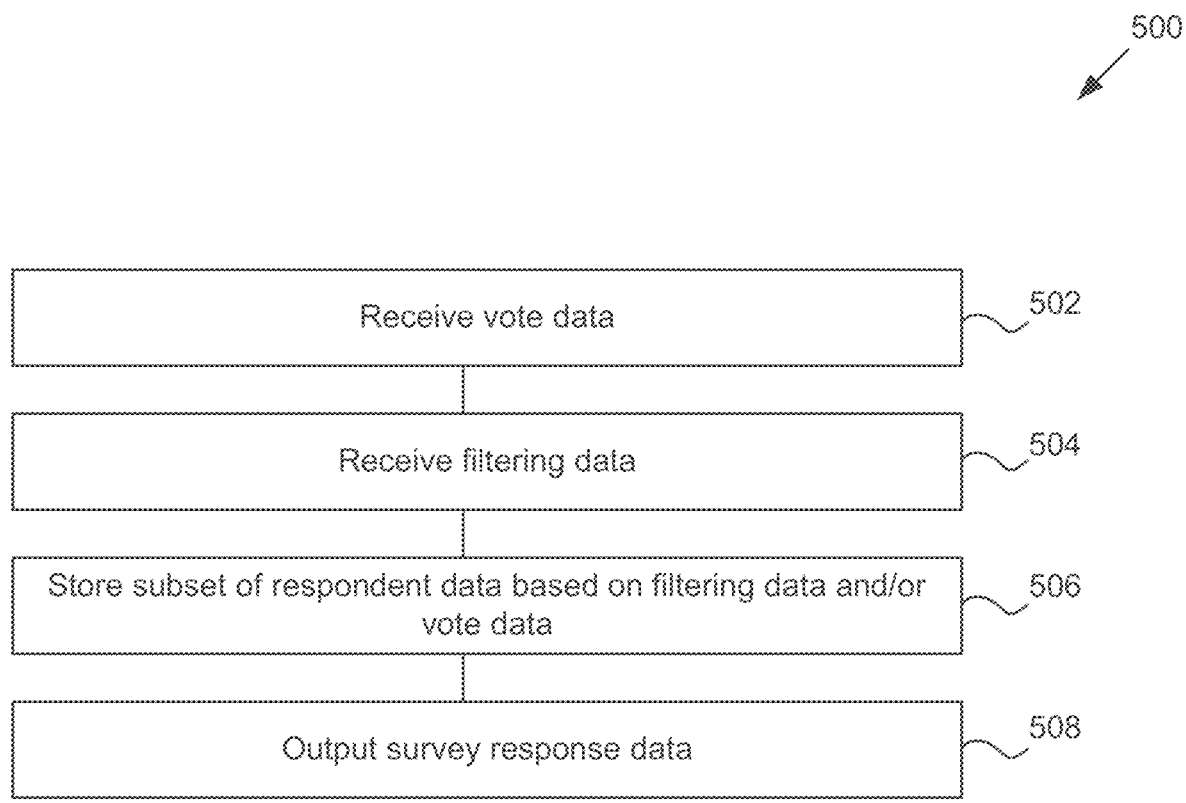
FIG. 5 illustrates a method of voting on whether to include an individual participant in the segment database, according to an embodiment.

FIG. 5 illustrates a method 500 of voting on whether to include an individual participant in the segment database, according to an embodiment. While an individual participant may seem, according to the filtering response data, to be a good candidate for the segment database, the researcher may, based on subjective information available to the researcher, want to exclude the participant. Conversely, while the individual participant may seem, according to the filtering response data, to be a poor candidate for the segment database, the researcher may, based on the subjective information, want to include the participant. Such subjective information may be obtained through collaboration with other researchers and/or collaborators, and may provide valuable insight for the research study.

The method 500 may be executed by a collaboration server configured to execute the elements of the method 500 (e.g. the collaboration server 120). The method 500 may include receiving vote data (block 502). The vote data may correspond to a vote by a researcher on whether to include the individual participant in the segment database. The vote data may correspond to votes by two or more researchers and/or collaborators on whether to include the individual participant in the segment database. The vote data may be binary (e.g. true or false). The vote data may be scaled (e.g., on a scale of one to ten, how likely is the individual participant to be of interest in the research study). The vote data may be scaled using a Likert-style scale to represent a voter's suggestion to include or exclude a potential participant (e.g., strong exclude, possible exclude, neutral, possible include, strong include, and so forth). The segment database may be limited to include a predetermined number of participants. Researchers may be provided, by the collaboration server via the virtual dashboard, polling data that corresponds to voting results for an individual participant.

The method 500 may include receiving the filtering response data (block 504). The filtering response data may be used in conjunction with the vote data to determine whether to move the individual participant forward in the research study. The vote data may be combined with the filtering response data to determine the scored response data. The vote data may be used separately to determine whether the individual participant moves forward in the research study, regardless of whether the scored response data and/or the filtering response data indicates the individual participant should move forward in the research study. For example, the vote data may indicate that a number of votes from collaborators are associated with the individual participant. In response to the number of votes meeting a threshold number of votes, the individual participant may be moved forward in the research study. The vote data may be used separately to determine the scored response data. For example, when the vote data indicates the individual participant should be included in the segment database, the scored response data may automatically include at least the minimum score for the individual participant. When the vote data indicates the participant should be excluded from the segment database, the scored response data may automatically include a score that is less than the minimum score for the individual participant.

The method 500 may include storing a subset of the respondent data (e.g. the survey response data associated with the individual participant) in the segment database based on the filtering response data and/or the vote data (block 506). The method 500 may include outputting the survey response data to a user device, such as via the virtual dashboard (block 508). The survey response data may include an indication the individual participant is included in the segment database.

The minimum score corresponding to the filtering response data may be based at least in part on the vote data. Alternatively, the vote data may override the scored response data in determining whether the survey response data is included in the segment database (e.g., the survey responses may score in the $90^{th}$ percentile as being desirable, but the researchers and/or collaborators may look at the individual participant's information and vote strong exclude). The processing server may be configured to exclude the survey response data from the segment database in response to the vote data indicating the individual participant should not be included in the segment database. This may, for example, be accomplished using if-then logic (e.g. if false, end). The processing server may be configured to include the survey response data from the segment database in response to the vote data indicating the individual participant should be included in the segment database. This may, for example, be accomplished using if-then logic (e.g. if true, put to database).

Figure 6:
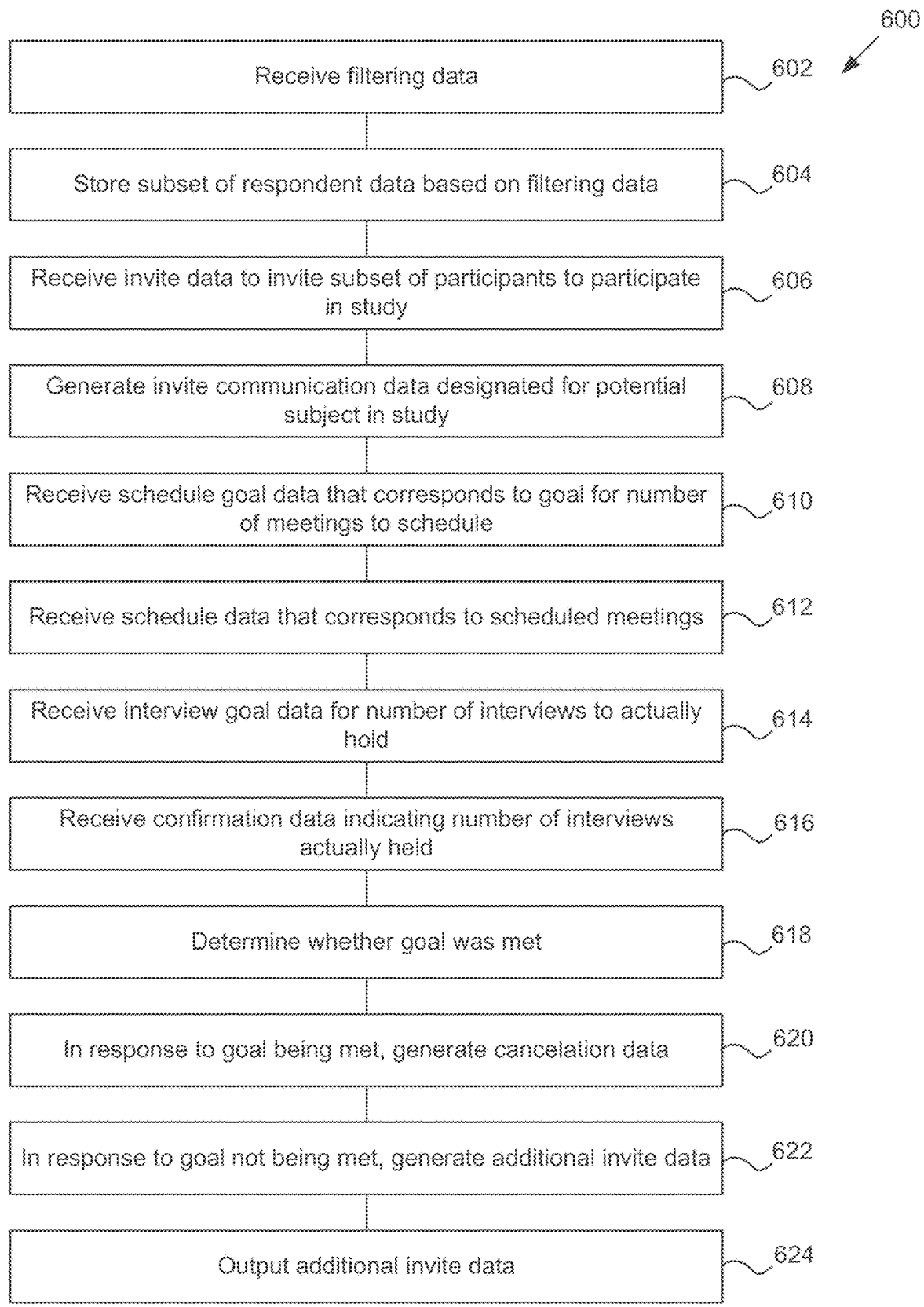
FIG. 6 illustrates a method of ensuring sufficient meetings are scheduled to meet an appointment goal, according to an embodiment.

FIG. 6 illustrates a method 600 of ensuring sufficient meetings are scheduled to meet an appointment goal, according to an embodiment. Researchers may desire to hold a specific number of appointments to obtain enough information for the research study to be empirically significant. Holding more appointments than necessary may unnecessarily incur time and expenses for researchers. Holding too few appointments may not provide empirically significant results for the research study. When not enough participants schedule and/or show up for appointments, researchers may have to spend extra time selecting and inviting additional participants. The method 600 obviates these issues by automating the scheduling process with specific steps that ensure the correct number of appointments are actually held.

The method 600 may be executed by a scheduling server configured to execute the elements of the method 600 (e.g. the scheduling server 122). The method 600 may include receiving the filtering response data (block 602). The method 600 may include storing a subset of the respondent data in the segment database based on the filtering response data (block 604). Alternatively or additionally, the segment database may be populated by a data set that has already been sorted, filtered, reviewed, and/or otherwise determined to be the group of participants of interest in the research study.

The method 600 may include receiving invite data (block 606). The invite data may correspond to a number of potential participants to invite to participate in the research study. The invite data may correspond to a number of potential participants to advance in the research study. For example, the potential participants may be drawn from the segment database. All the respondents reflected in the segment database may be invited to advance in the research study or a portion of the respondents reflected in the segment database may be invited to advance in the research study.

The invite data may be received via input by the researcher in the researcher virtual dashboard. The invite data may be received automatically in response to the segment database being populated. For example, a processing server in communication with the scheduling server (e.g. the processing server 118 and the scheduling server 122) may, in response to the segment database being populated with the survey response data corresponding to the individual participant, generate the invite data based on communication information for the individual participant in the survey response data.

The method 600 may include generating invite communication data (block 608). The invite communication data may be based on the invite data. The invite communication data may correspond to a communication designated for the potential participants to advance in the research study. The communication may invite the potential participants to participate and/or further participate in the research study. The invite communication data may include scheduling options for the potential participants to schedule appointments with the researcher(s). The invite communication data may include information about how to deliver the invitation to the potential participants. The invite communication data may be output to one or more user devices that correspond to the potential participants. The invite communication data may be sent via email, text, paper letter, automated phone call, a non-automated phone call (e.g., a phone call by a person), a video call, and/or via a message using the virtual dashboard.

The method 600 may include receiving schedule goal data (block 610). The schedule goal data may correspond to a goal for a number of appointments to schedule with the potential participants. The number of appointments to schedule may be fewer than the number of potential participants associated with the invite data. A portion of the potential participants invited to participate and/or advance in the research study may schedule appointments. The portion that schedules appointments may be less than the total number of potential participants invited to participate and/or advance in the research study. The portion of the potential participants that actually complete an appointment may be less than the portion that schedule appointments. The schedule goal data may reflect a goal for the number of appointments to schedule so that enough potential participants actually complete appointments.

The method 600 may include receiving schedule data (block 612). The schedule data may correspond to scheduled appointments with at least a portion of the potential participants. The scheduled appointments may be reflected in calendar data associated with an interviewing researcher. For example, the schedule data may include a date, time, and/or location for an appointment by a particular researcher with the individual participant. The calendar data may be associated with a digital calendar and/or specified availability for the interviewing researcher. The interviewing researcher's digital calendar may be updated with the date, time, and/or location for the appointment with the individual participant.

The method 600 may include receiving appointment goal data (block 614). The appointment goal data may correspond to a goal for a number of appointments to actually hold with the potential participants. The goal for the number of appointments to actually hold may be fewer than the goal for the number of appointments to schedule. This may allow for at least some of the potential participants to miss their appointment and for a sufficient number of appointments to still be held so that the research study is empirically significant.

The method 600 may include receiving confirmation data (block 616). The confirmation data may correspond to appointments actually held with study participants. The confirmation data may indicate a number of appointments actually held with the study participants (i.e. where study participants are potential participants that actually completed an appointment). The method 600 may include determining whether the goal for appointments actually held was met (block 618). The determination may be made based at least in part on the confirmation data and/or the appointment goal data. The determination may be made by comparing the number of appointments actually held as reflected in the confirmation data with the goal reflected in the appointment goal data.

The method 600 may include generating cancelation data (block 620). The cancelation data may be generated in response to the confirmation data indicating the goal for the number of appointments to actually complete was met. The cancelation data may correspond to a message informing remaining potential participants associated with the appointment goal data that their participation in the research study is not needed. The scheduling server may be configured to output, to the potential participants (e.g. via the participant virtual dashboard, via text message, via email, and so forth), the cancelation data. The cancelation data may correspond to remaining appointments with the remaining potential participants being removed from the calendar data associated with the interviewing researcher. The scheduling server may be configured to edit the calendar data to remove the remaining appointments for some or all invited parties, which may include researchers, collaborators, participants, and/or others.

The method 600 may include generating additional invite data (block 622). The additional invite data may be generated in response to the confirmation data indicating the goal for the number of appointments to actually complete was not met. The additional invite data may correspond to inviting additional potential participants to participate in the research study. The additional potential participants may be drawn from the segment database. The additional potential participants may be identified via a screener survey that adds more respondents to the pool of respondents. The additional invite data may correspond to inviting one or more potential participants on a waitlist to participate in the research study. The waitlist may include potential participants that scheduled appointments but were not invited to appointments because the schedule goal was met. The waitlist may include potential participants that desired to be included in the study but were previously unable to schedule an appointment because the schedule goal was met. Researchers may choose to select additional potential participants through manual or automated means, and/or to extend invitations to them for participation in the research study.

The method 600 may include outputting the additional invite data to one or more additional devices associated with the additional potential participants (block 624). The additional invite data may be output via the virtual dashboard. The additional invite data may be output as a screener survey that pops up when an individual navigates to a particular website. The additional invite data may be output via an automated phone call, a phone call by a person, a video call, a text message, an instant message, an email, and/or a paper letter.

In some cases, a potential participant may be a no-show for a scheduled appointment. The research study may still be open and one or more appointment blocks for the research study may still be available. No-show data may be received at, for example, a scheduling server from a researcher device or a collaborator device. In response to receiving the no-show data, the scheduling server may automatically generate a communication such as an email inviting the potential participant that was a no-show to schedule another appointment. In response to receiving the no-show data, the scheduling server may automatically generate a communication inviting another potential participant to schedule an appointment. The communication may include a link that directs the invited participant to a participant dashboard where the potential participant may schedule an appointment. The scheduling server may transmit the communication to a device and/or server associated with the potential participant.

Figure 7:
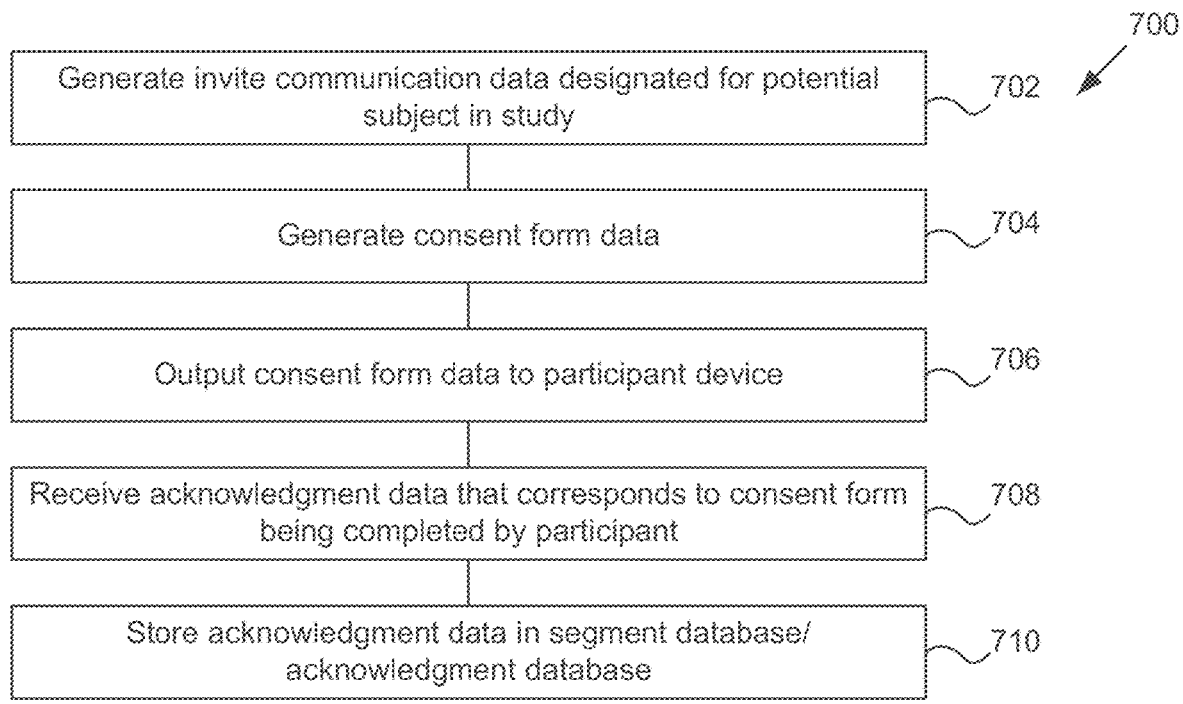
FIG. 7 illustrates a method of managing consent information, according to an embodiment.

FIG. 7 illustrates a method 700 of managing consent information, according to an embodiment. In order to participate in the research study, the customer and/or researcher may request that participants review, acknowledge, fill out, and/or sign various documents and/or disclaimers. These documents may be waivers and/or consents to use the participants' information and/or likeness for the research study and/or other purposes. These documents may have additional survey and/or study-related questions for the participant. In some cases, the participant may be required to answer the additional survey and/or study-related questions.

When dealing with dozens or hundreds of participants, the scale of the study may make it challenging to handle the documents, including storing them and making them easy to find and/or navigate by the various stakeholders in the research study. The method 700 may streamline and simplify the document handling process for a research study.

The method 700 may be executed by a scheduling server configured to execute the elements of the method 700 (e.g. the document server 124). The method 700 may include generating invite communication data designated for a potential participant in the research study (block 702). The invite communication data may invite the potential participant to participate in the research study. The potential participant may accept the invitation, such as by scheduling an appointment, by completing a survey, and/or by completing documents associated with the invite communication data.

The method 700 may include generating consent form data that corresponds to a consent form to be completed by the individual participant (block 704). The consent form may be generated for display in the virtual dashboard. The consent form may be generated for display in another communication system, such as by email, in an online form and/or survey, and/or by a third-party system for collecting electronic signatures. The consent form may be generated for printing to a physical form on paper. The consent form data may be generated automatically based on a consent form template. The consent form template may be stored in a consent form database (e.g. the document database 116). The consent form data may be generated in response to manual input. The manual input may be, for example, by the researcher and/or the customer. The manual input may be received via the virtual dashboard. The manual input may correspond to a custom format for the consent form.

The method 700 may include outputting the consent form data (block 706). The consent form data may be output to the device associated with the individual participant, such as via the participant virtual dashboard. The method 700 may include receiving acknowledgment data (block 708). The acknowledgment data may correspond to the consent form being completed by the individual participant. The acknowledgment data may be received from the participant virtual dashboard. The acknowledgment data may be received from the researcher virtual dashboard. For example, the individual participant may send a completed paper copy of the consent form to the researcher and the researcher may scan a copy of the paper copy into the researcher's computer. The method 700 may include storing the acknowledgment data in an acknowledgment database and/or the segment database (block 710).

The method 700 may save researchers and collaborators time by allowing them to identify whether a participant has signed and/or completed documents associated with the consumer survey such as required documents before an appointment. A scheduling server and document server may communicate automatically to determine whether required documents have been completed before a scheduled appointment. The scheduling server or the document server may prompt a communication server to generate a communication for the participant in response to one or more required documents being incomplete within a specified time before the scheduled appointment. The specified time may be designated by a researcher and/or collaborator.

Figure 8:
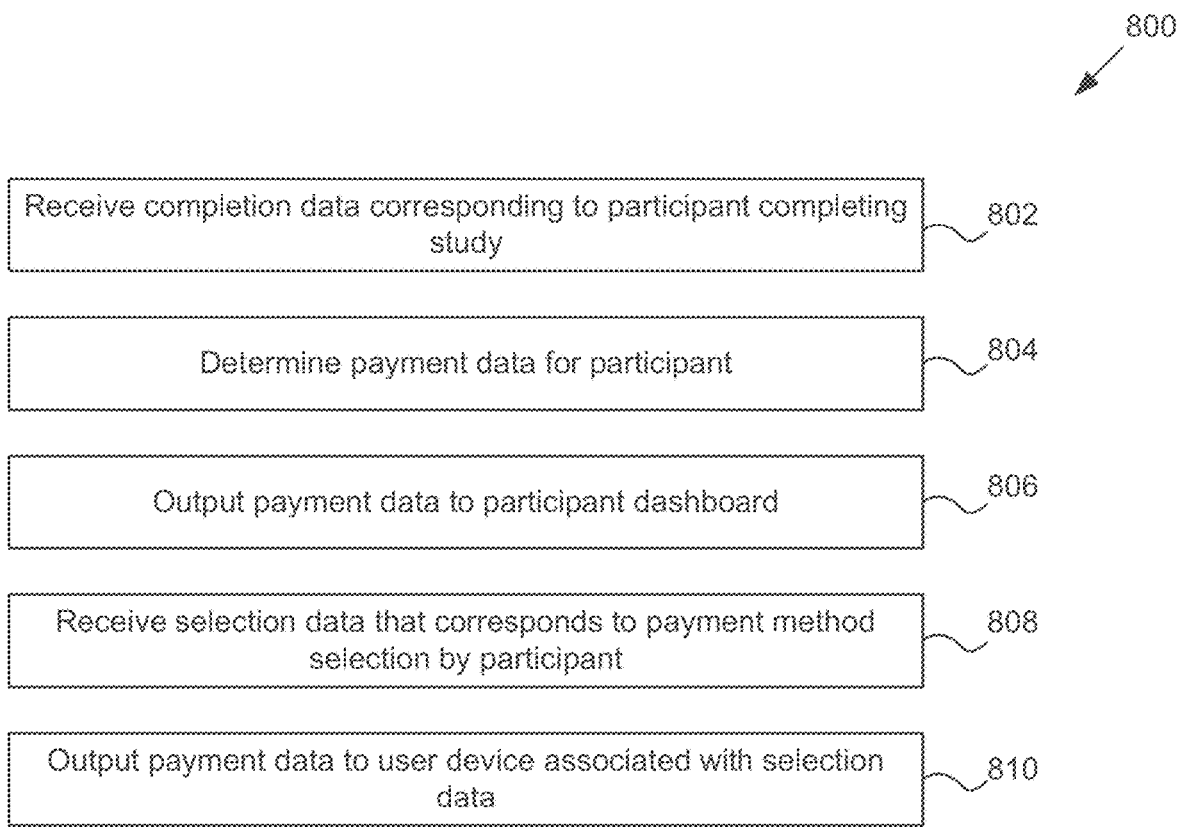
FIG. 8 illustrates a method of paying a participant for participation in a research study, according to an embodiment.

FIG. 8 illustrates a method 800 of paying a participant for participation in a research study, according to an embodiment. Customers and/or researchers may pay participants for participation in the research study. The faster and simpler it is for the participant to receive payment, and/or the more payment options that are offered, the more likely a potential participant is to convert to an actual participant. The method 800 provides a simple and robust way for customers and/or researchers to provide payment to participants such that potential participants are incentivized to participate in the research study.

The method 800 may be executed by a payment server configured to execute the elements of the method 800 (e.g. the payment server 126). The method 800 may include receiving completion data (block 802). The completion data may indicate that the individual participant has completed the research study. The completion data may be received from the researcher virtual dashboard (e.g. the researcher may indicate via the virtual dashboard that the individual participant has completed participation in the research study). The completion data may be received from the participant virtual dashboard (e.g. the individual participant may complete a survey via the virtual dashboard, and upon completion of the survey the completion data is generated). The completion data may be received from the customer virtual dashboard (e.g. the customer may authorize one or more participants for payment upon completion of the research study).

The completion data may be generated automatically, such as by a processing server in communication with the payment server (e.g. the processing server 118 and the payment server 126). The completion data may be generated automatically in response to the processing server receiving a notification, such as from a survey server (e.g. the survey server 130) that the individual participant has completed the research study. The completion data may be generated automatically when the individual participant completes an appointment (e.g. the scheduling server may receive data indicating the participant has completed the appointment and may pass the completion data to the payment server).

The method 800 may include determining payment data associated with the individual participant and the research study (block 804). The payment data may correspond to payment to the individual participant for completing the research study. The payment data may include one or more options for what type of payment the individual participant may receive (e.g. cash, a gift card, a voucher, a coupon, and so forth). The payment data may include one or more options for how the individual participant may receive the payment (e.g. via mail, via email, via bank deposit, and so forth).

The method 800 may include outputting the payment data (block 806). The payment data may be output to a device associated with the individual participant. The payment data may be output to the participant virtual dashboard. The participant virtual dashboard may be configured to display the payment receipt option associated with the payment data. The method 800 may include receiving selection data that corresponds to a payment receipt option being selected by the individual participant (block 808). The selection data may be received from the device associated with the individual participant. The selection data may be received from the participant virtual dashboard. The method 800 may include outputting the payment data to a payment device indicated in the selection data (block 810). The payment device may deliver the payment to the individual participant according to the payment receipt option selected by the individual participant.

Figure 9:
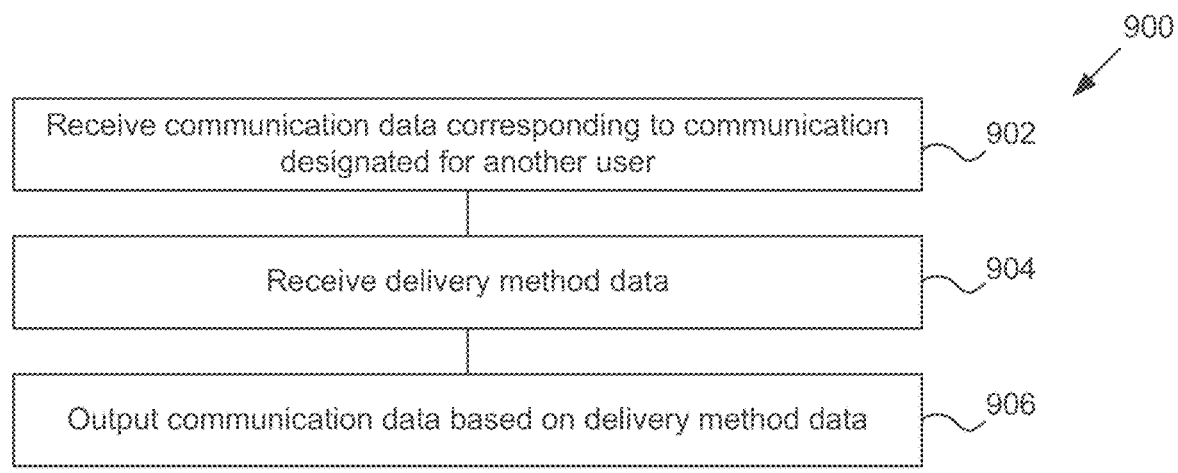
FIG. 9 illustrates a method of communicating with a system user, according to an embodiment.

FIG. 9 illustrates a method 900 of communicating with a system user, according to an embodiment. Having open and easily traceable lines of communication with stakeholders may be important to ensuring the research study proceeds efficiently. The method 900 may enable efficient communication during the research study.

The method 900 may be executed by a communication server configured to execute the elements of the method 900 (e.g. the communication server 128). The method 900 may include receiving communication data (block 902). The communication data may be received from a first virtual dashboard running on a first device associated with a user of the research study system (e.g. the researcher, the customer, the participant, and so forth). The communication data may correspond to a communication designated for another system user.

The first virtual dashboard may be a first instance of the researcher virtual dashboard associated with a first researcher. The first virtual dashboard may be a second instance of the researcher virtual dashboard running on a second device associated with a second researcher. The first virtual dashboard may be the participant virtual dashboard. The first virtual dashboard may be the customer virtual dashboard. The other system user may be the first researcher associated with the first instance of the researcher virtual dashboard. The other system user may be the second researcher associated with the second instance of the researcher virtual dashboard. The other system user may be the individual participant. The other system user may be the customer.

The method 900 may include receiving delivery method data (block 904). The delivery method data may be received from the first dashboard. The delivery method data may correspond to a delivery method for the communication data. The delivery method may include a dashboard message (e.g. a message from one instance of the virtual dashboard to another instance of the virtual dashboard). The delivery method may include an instant message. The instant message may be delivered between instances of the virtual dashboard. The instant message may be designated for a third-party instant messaging system. The delivery method may include an email. The delivery method may include a text message. The delivery method may include a call such as an automated phone call, a phone call by a person such as a researcher and/or collaborator, and/or a video call. The call may, for example, be executed using an application that transmits data over an internet connection such as via WhatsApp®, FaceTime®, and so forth. The delivery method may include a paper letter sent in the mail.

The method 900 may include outputting the communication data (block 906). The communication data may be output to a corresponding device that corresponds to the delivery method. The corresponding device may be a computer associated with the other system user (e.g. the personal computer 138). The corresponding device may be a phone associated with the other system user (e.g. the smartphone 136). The corresponding device may be a printer configured to print the paper letter (e.g. the printer 140).

The communication may be a templated message. The communication server may be configured to match the communication data with template message data. The communication data may indicate a selection of a templated message associated with the template message data. The communication data output to the corresponding device may include the template message data.

Figure 10:
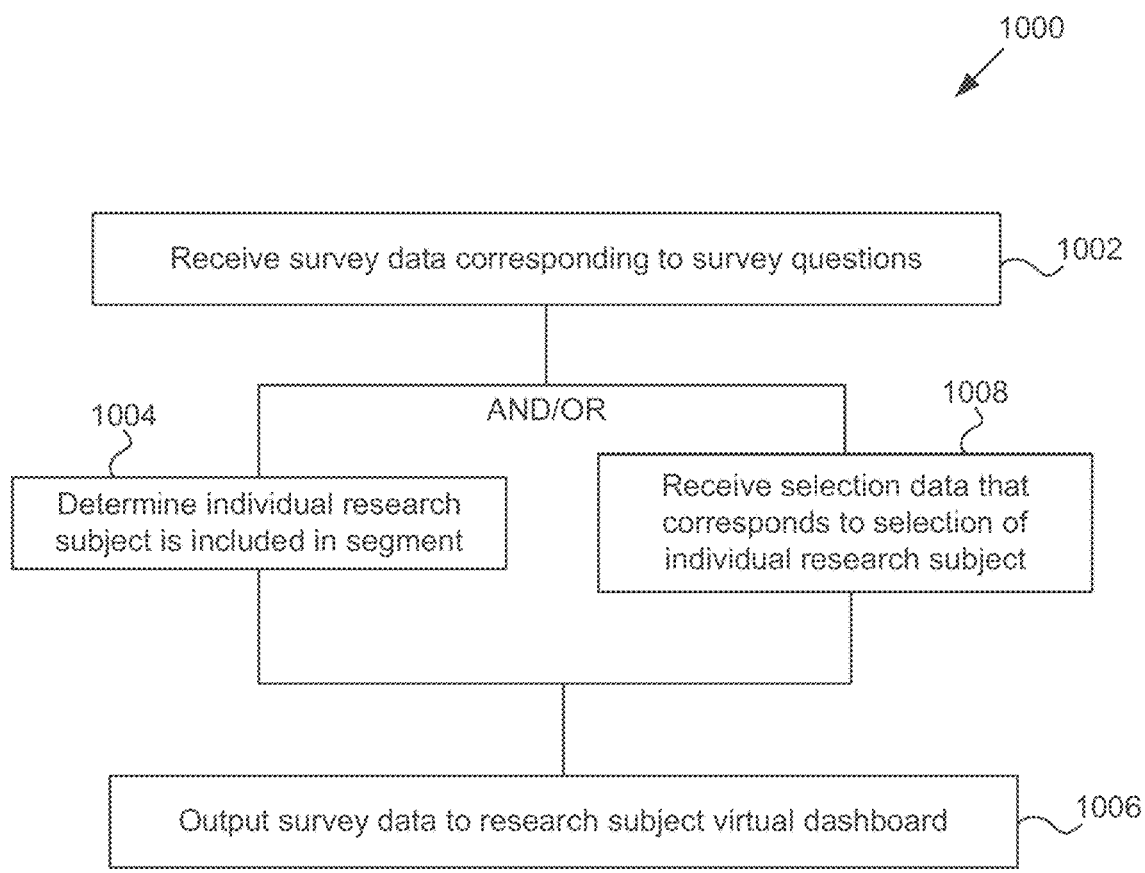
FIG. 10 illustrates a method outputting a survey to a participant device, according to an embodiment.

FIG. 10 illustrates a method 1000 outputting a survey to a participant device, according to an embodiment. The survey may enable the researchers to gather information about potential participants in the study and/or current participants in the research study. The information may be used to advance respondents in the research study. The method 1000 may be used to automatically and/or manually determine which respondents to advance in the research study.

The method 1000 may be executed by a survey server configured to execute the elements of the method 1000 (e.g., the survey server 130). The method 1000 may include receiving initial and/or secondary survey data (block 1002). The survey data may be received from the virtual dashboard (e.g., the researcher virtual dashboard, the participant virtual dashboard, and so forth). The survey data may correspond to an initial survey used to fill the pool of participants. The survey data may correspond to a survey for the pool of participants to identify candidates for the segment database. The survey data may correspond to a second survey for the subset of the pool of participants in the segment database.

For example, the survey data may correspond to a survey for the subset of the pool of participants. The method 1000 may include determining the individual participant is included in the segment database (block 1004). The method 1000 may include, in response to determining the individual participant is included in the segment database, outputting the survey data to the participant, such as via the participant virtual dashboard (block 1006). The method 1000 may include receiving selection data that indicates the individual participant is selected for the second survey (block 1008). The selection data may be received from the first instance of the researcher virtual dashboard, such as in a case where the researcher selects the individual participant to take a secondary survey reflected in the survey data. The method 1000 may include, in response to receiving the selection data, outputting the survey data to the participant, such as via the participant virtual dashboard (block 1006).

Figure 11:
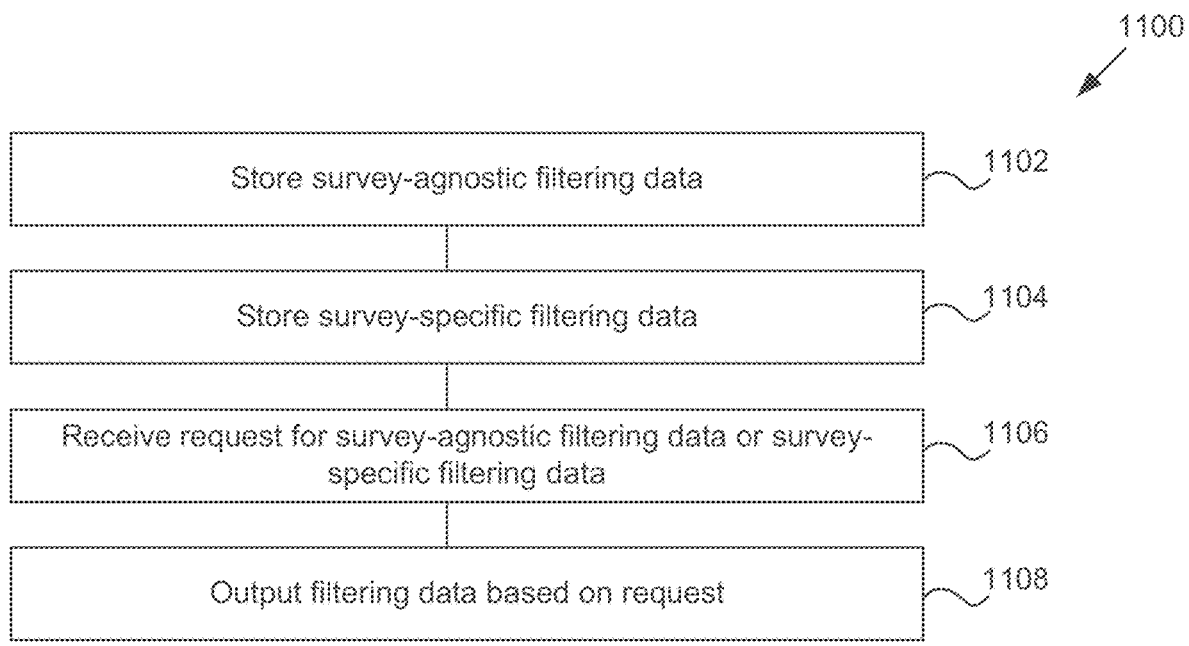
FIG. 11 illustrates a method for filtering respondent data, according to an embodiment.

FIG. 11 illustrates a method 1100 for filtering respondent data, according to an embodiment. A researcher may want to filter the respondent data that corresponds to the pool of respondents, a subset of the pool of respondents, respondents in the segment database, a subset of the respondents in the segment database, and so forth. The filtering may be unique (e.g. specific to a particular research study and/or survey). The filtering may be generic (e.g. may be applicable to multiple different studies for the same customer and/or different customers). The method 1100 may enable researchers to efficiently apply filters to and quickly identify participants to advance in a particular research study.

The method 1100 may be executed by a filtering server configured to execute the elements of the method 1100 (e.g. the filtering server 132). The method 1100 may include storing survey-agnostic filtering response data (block 1102). The survey-agnostic filtering response data may correspond to a first data filter that is generally applicable to a variety of surveys. The survey-agnostic filtering response data may be stored in a filter database. The method 1100 may include storing survey-specific filtering response data (block 1104). The survey-specific filtering response data may correspond to a second data filter that is specifically applicable to an individual survey. The survey-specific filtering response data may be stored in a filter database.

The method 1100 may include receiving a request for the survey-agnostic filtering data and/or the survey-specific filtering data (block 1106). The request may be generated by, for example, a processing server in communication with the filtering server (e.g. the processing server 118 and the filtering server 132). The request may be received at the processing server from an instance of the researcher virtual dashboard in response to input by the researcher to apply the requested filtering data to the respondent data and/or the segment data. The method 1100 may include outputting the survey-agnostic filtering data or the survey specific filtering data (block 1108). The filtering response data may be output to the processing server. For example, the filtering response data received by the processing server as described regarding FIG. 4 may be the survey-agnostic filtering data and/or the survey specific filtering data.

Figure 12:
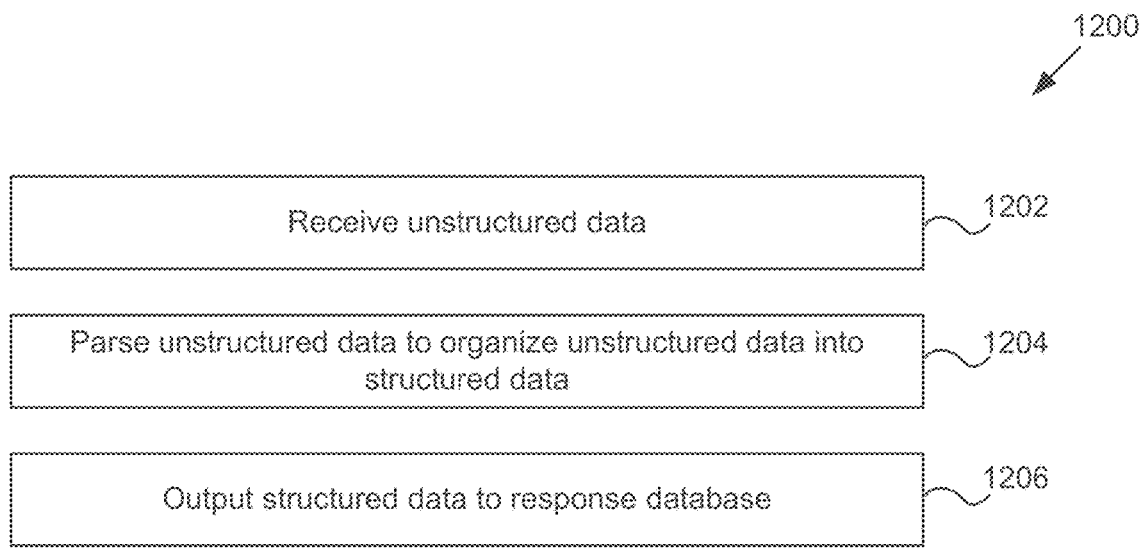
FIG. 12 illustrates a method for importing respondent data, according to an embodiment.

FIG. 12 illustrates a method 1200 for importing respondent data, according to an embodiment. In some cases, a researcher may engage in the research study after at least some information for the research study has already been collected. The information may be provided as unstructured data. The method 1200 may enable the researcher to integrate the unstructured data into a usable format for the research study system.

The method 1200 may be executed by a processing server configured to execute the elements of the method 1200 (e.g. the processing server 118). The method 1200 may include receiving unstructured data (block 1202). For example, the survey response data may include unstructured data. The survey response data may be imported from an external database (e.g. the external database 142. The response database and/or the segment database associated with the research study system (e.g. the response database 112 and/or the segment database 114) may be a relational database.

The method 1200 may include parsing the unstructured data (block 1204). The unstructured data may be parsed according to a response type. The parsing may organize the unstructured data into structured data. For example, the unstructured data may be parsed according to a natural language processing (NLP) algorithm. The NLP algorithm may tag natural language in the unstructured data to associate the natural language with specific types of information associated with the respondent data.

As a specific example, the unstructured data may include an online review written by a potential participant that is a review of the customer and/or the customer's goods/services. The NLP algorithm may perform a sentiment analysis of the online review to determine whether the potential participant is satisfied with the customer. The sentiment analysis may determine the potential participant is unsatisfied with the customer. The processing device may generate an entry in the response database for the potential participant. The entry may be, for example, associated with the participant and the question "How satisfied are you with our products". The entry may be an expected entry, such as "unsatisfied." The entry may be based on the sentiment analysis of the unstructured data.

The unstructured data may include multiple answer selections associated with one data entry. The parsing may segregate the answer selections to separate data entries. The unstructured data may include multiple elements of demographic information about the potential participant in one data entry. The parsing may segregate the demographic information to separate data entries. The method 1200 may include outputting the structured data to the response database (block 1206). The structured data may form at least a portion of the respondent data. The structured data may be the survey response data associated with the individual participant.

Figure 13:
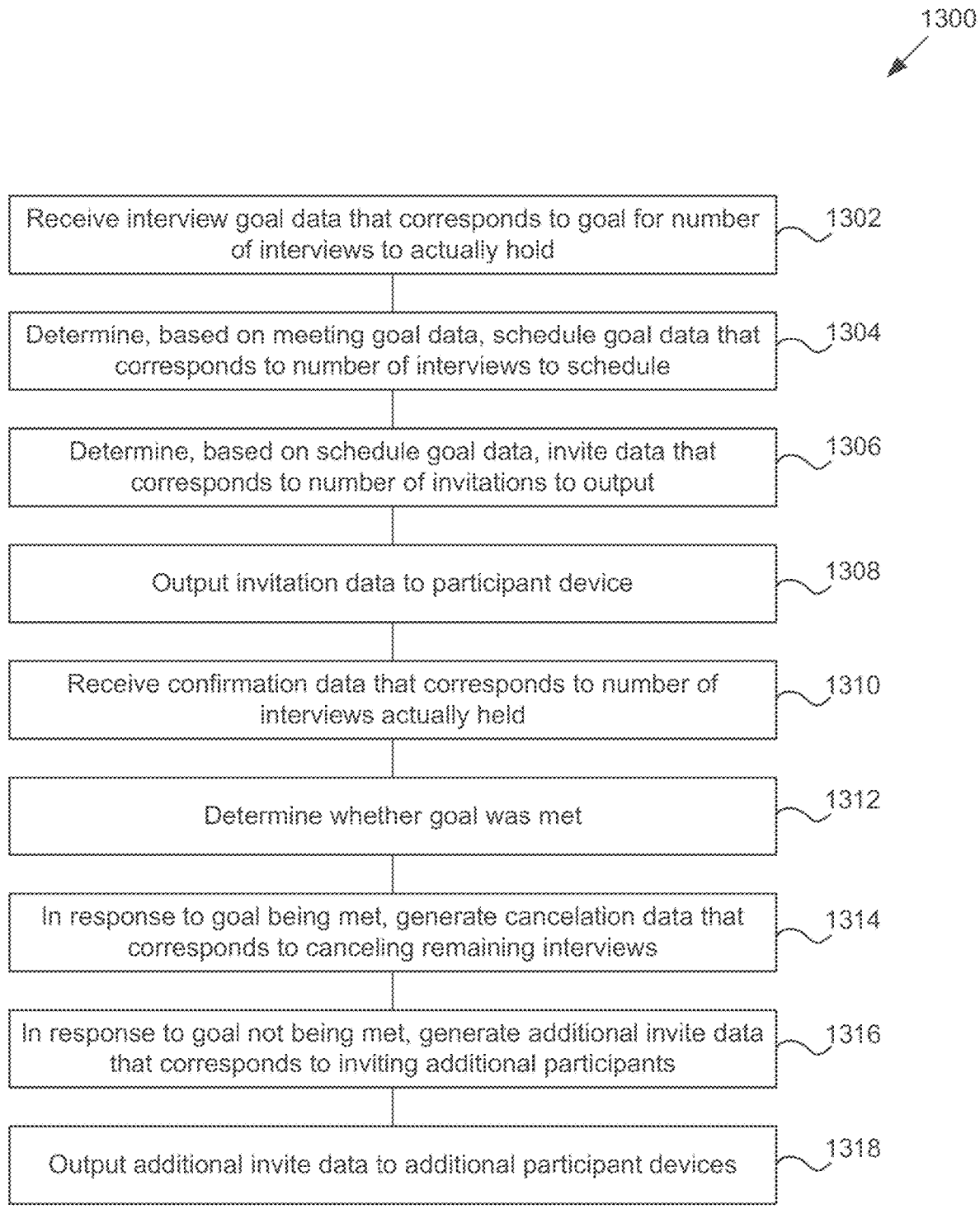
FIG. 13 illustrates a method for ensuring enough appointments are scheduled to satisfy an appointment goal, according to an embodiment.

FIG. 13 illustrates a method 1300 for ensuring enough appointments are scheduled to satisfy an appointment goal, according to an embodiment. The research study system may automatically ensure that the researchers schedule enough appointments. The system may take into account that some scheduled appointments will fall through and that some potential participants invited for an appointment will not schedule an appointment. This may make it easier for an appointment to manage her schedule and ensure that enough appointments are held for the research study to be empirically significant.

The method 1300 may be executed by a scheduling server configured to execute the elements of the method 1300 (e.g. the scheduling server 122). The method 1300 may include receiving appointment goal data (block 1302). The appointment goal data may correspond to a goal for a number of appointments to actually hold with potential participants for the research study. The potential participants may be drawn from the segment database. The potential participants may be drawn from the pool of participants. The potential participants may be identified via a screener survey.

The method 1300 may include determining schedule goal data (block 1304). The schedule goal data may be based on the appointment goal data. The schedule goal data may correspond to a number of appointments to schedule with the potential participants. The number of appointments to schedule may be greater than the number of appointments to actually hold. The number of appointments to schedule may be greater than the number of appointments to actually hold by a percentage in a range that is from ten percent to fifty percent. For example, the goal for the number of appointments to hold may be ten appointments. The goal for the number of appointments to schedule may be 12 appointments. The extra appointments may be scheduled in anticipation that at least some scheduled appointments may not be completed (e.g. the participant cancels or fails to show up for the appointment, and so forth).

The method 1300 may include determining invite data (block 1306). The invite data may be based on the schedule goal data. The invite data may correspond to a number of the potential participants to invite to participate in the research study. The number of the potential participants to invite to participate in the research study may be greater than the number of appointments to schedule by a percentage in a range that is from twenty percent to one hundred percent, from one hundred percent to two hundred percent, from fifty percent to one hundred and fifty percent, and so forth. For example, the goal for the number of appointments to schedule may be twelve appointments. The invite data may correspond to invitations for thirty people to schedule appointments. The extra invitations may be sent in anticipation that at least a portion of the potential participants invited will actually schedule appointments.

The method 1300 may include outputting invitation data (block 1308). The invitation data may be output to a device associated with a potential participant. The invitation data may be based on the invite data. The invitation data may correspond to an invitation for an individual potential participant to schedule an appointment with an individual researcher.

The method 1300 may include receiving confirmation data (block 1310). The confirmation data may correspond to appointments actually held with study participants. For example, the confirmation data may indicate that researchers completed ten appointments with study participants. The confirmation data may be generated in response to an input received from a researcher device indicating a status for one or more appointments. The status may indicate the participant showed up for the appointment, did not show up for the appointment, and/or other information about the appointment. An automatic prompt may be delivered from a scheduling server, for example, to the researcher device requesting a status update from the researcher for the appointment. The automatic prompt may be scheduled to be sent to the researcher device at a specified time after the appointment is scheduled to begin.

The method 1300 may include determining, based on the confirmation data and the appointment goal data, whether the goal for the number of appointments to actually hold was met (block 1312). For example, the appointment goal data may indicate a goal of completing ten appointments and the confirmation data may indicate ten appointments were actually held. The scheduling server may be programmed with logic to perform the comparison.

The method 1300 may include generating cancelation data (block 1314). The cancelation data may be generated in response to the confirmation data indicating the goal for the number of appointments to actually complete was met. For example, the scheduling server may be programmed with if-then logic (e.g. if goal </=actual, output cancelation). The cancelation data may correspond to remaining appointments with remaining potential participants being removed from calendar data associated with an interviewing researcher that has remaining appointments on her calendar. The cancelation data may, for example, be communicated from the scheduling server to a communication server. The communication server may communicate message data to a participant device. The message data may indicate the participant is not needed for the study, may indicate the participant's appointment is canceled, and/or may include compensation data for compensating the participant (e.g., via a coupon, voucher, gift card, cash, and so forth). The participant may automatically be compensated in response to the cancelation data.

The method 1300 may include generating additional invitation data (block 1316). The additional invitation data may be generated in response to the confirmation data indicating the goal for the number of appointments to actually complete was not met. The additional invitation data may correspond to inviting additional potential participants to participate in the research study. The method 1300 may include outputting, to one or more additional devices for communicating with the additional potential participants, the additional invitation data (block 1318). The additional invitation data may be communicated to a researcher device and/or collaborator device so that the researcher and/or collaborator may determine whether additional participants should be invited.

Figure 14:
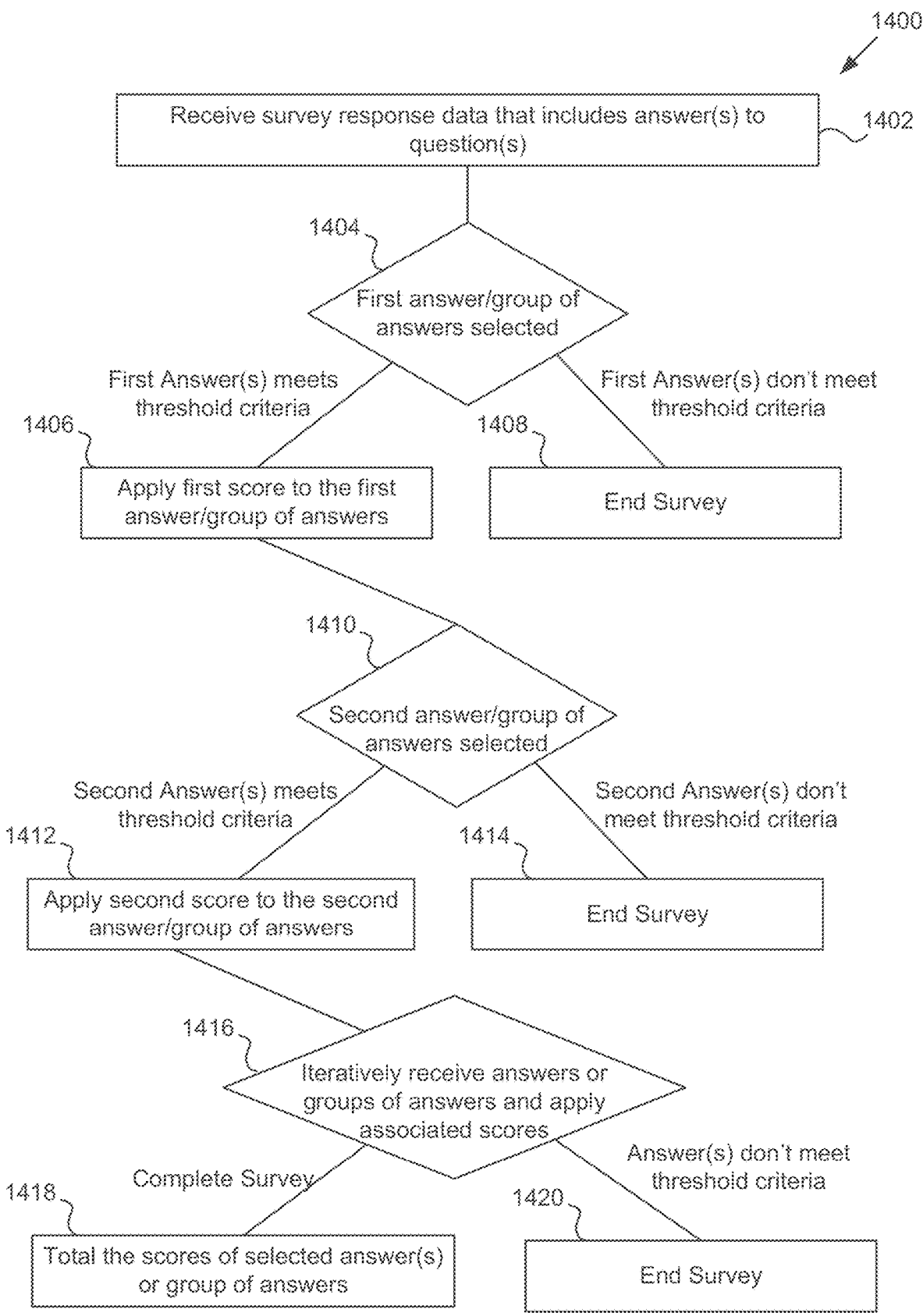
FIG. 14 illustrates a method for scoring survey response data, according to an embodiment.

FIG. 14 illustrates a method 1400 for scoring survey response data, according to an embodiment. In some consumer studies, multiple answer options for a single question may be presented to participants. The customer may be interested in participants that answer positively regarding a particular option regardless of what other answers the potential participant also selects other answer options for the question. The customer may be uninterested in participants that answer negatively or neutrally to the particular option. The customer may be interested in participants that answer positively to any one of multiple answer selections but may not be more interested in participants that answer positively to multiple answer selections the customer is interested in. The method 1400 may enable researchers to automatically identify potential participants that may be relevant to the research study.

The method 1400 may be executed by a processing server configured to execute the elements of the method 1400 (e.g. the processing server 118). The method 1400 may include receiving survey response data that includes one or more answer selections for one or more survey questions (block 1402). The individual survey question may include a first possible answer or group of answers, a second possible answer or group of answers, and so forth. The individual survey question may allow for selection of one of the possible answers or multiple of the possible answers. The individual survey question may allow for a text input, such as in a text box displayed in a graphical user interface. A character and/or word limit may be applied to the text box based on whether a relatively short answer is desired and/or expected (e.g., a sentence or phrase) or whether a relatively long answer is desired and/or expected (e.g., multiple sentences, multiple phrases, a paragraph, and so forth). The individual survey question may allow for selection of answers next to radio buttons and/or checkboxes. Answers may be limited to a single selection, multiple selections, and so forth.

The method 1400 may include determining whether the first possible answer or group of answers was selected (block 1404). The method 1400 may include, in response to the survey response data indicating the first possible answer was selected, determining if the first possible answer or group of answers meets a first threshold criteria. The method may include, in response to the first possible answer or group of answers not meeting the first threshold criteria, ending the survey (block 1408). The method may include, in response to the first possible answer or group of answers not meeting the first threshold criteria, applying a first score to the first possible answer or group of answers (block 1406). The threshold criteria may be a specific answer or set of answers, an answer or set of answers within a defined range, an answer or set of answers that includes a key word or phrase, an answer or set of answers that does not includes a key word or phrase, and so forth. For example, the threshold criteria may be set based on criteria such as an individual's income, salary, location, gender, interests, hobbies, ideologies, dislikes, and so forth.

The method 1400 may include determining whether the second possible answer or group of answers was selected (block 1410). The method 1400 may include, in response to the survey response data indicating the second possible answer was selected, determining if the first possible answer or group of answers meets a second threshold criteria. The method may include, in response to the second possible answer or group of answers not meeting the second threshold criteria, ending the survey (block 1414). The method may include, in response to the second possible answer or group of answers not meeting the second threshold criteria, applying a second score to the second possible answer or group of answers (block 1412). The threshold criteria may be a specific answer or set of answers, an answer or set of answers within a defined range, an answer or set of answers that includes a key word or phrase, an answer or set of answers that does not includes a key word or phrase, and so forth. For example, the threshold criteria may be set based on criteria such as an individual's income, salary, location, gender, interests, hobbies, ideologies, dislikes, and so forth.

The method 1400 may include iteratively receiving answers or groups of answers and applying the associated scores (block 1416). The method 1400 may include, in response to the survey response data indicating the iterative answers or groups of answers was selected, determining if the iterative answers or groups of answers meets a second threshold criteria. The method may include, in response to the iterative answers or groups of answers not meeting the second threshold criteria, ending the survey (block 1420). The method may include, in response to completing the survey totaling the scores of the selected answers or groups of answers (block 1418). In response to totaling the scores, the method 1400 may include providing a notification or a user interface where a user may sort, filter, or review the answers, the scores, or other information related to the user, the questions, the answers, or the survey.

For example, the customer may be interested in studying consumers that prefer apples or prefer oranges and may be uninterested in consumers that prefer bananas, grapes, or strawberries. The individual survey question may ask what type of fruit the potential participant prefers. The answer selections may be apples, oranges, bananas, grapes, and strawberries. The individual survey question may allow for the potential participant to select any combination of the answer selections. The processing server may assign a score ranging from −2 up to +2 to the survey response data associated with the potential participant. This allows researchers to later use filters to efficiently find the participants whose survey responses most closely match those desired for the study population.

The method 1400 and the accompanying examples are merely examples of how a processing server used in a research study system may score survey response data. Other similar modes and heuristics for scoring survey response data are also contemplated.

Figure 15:
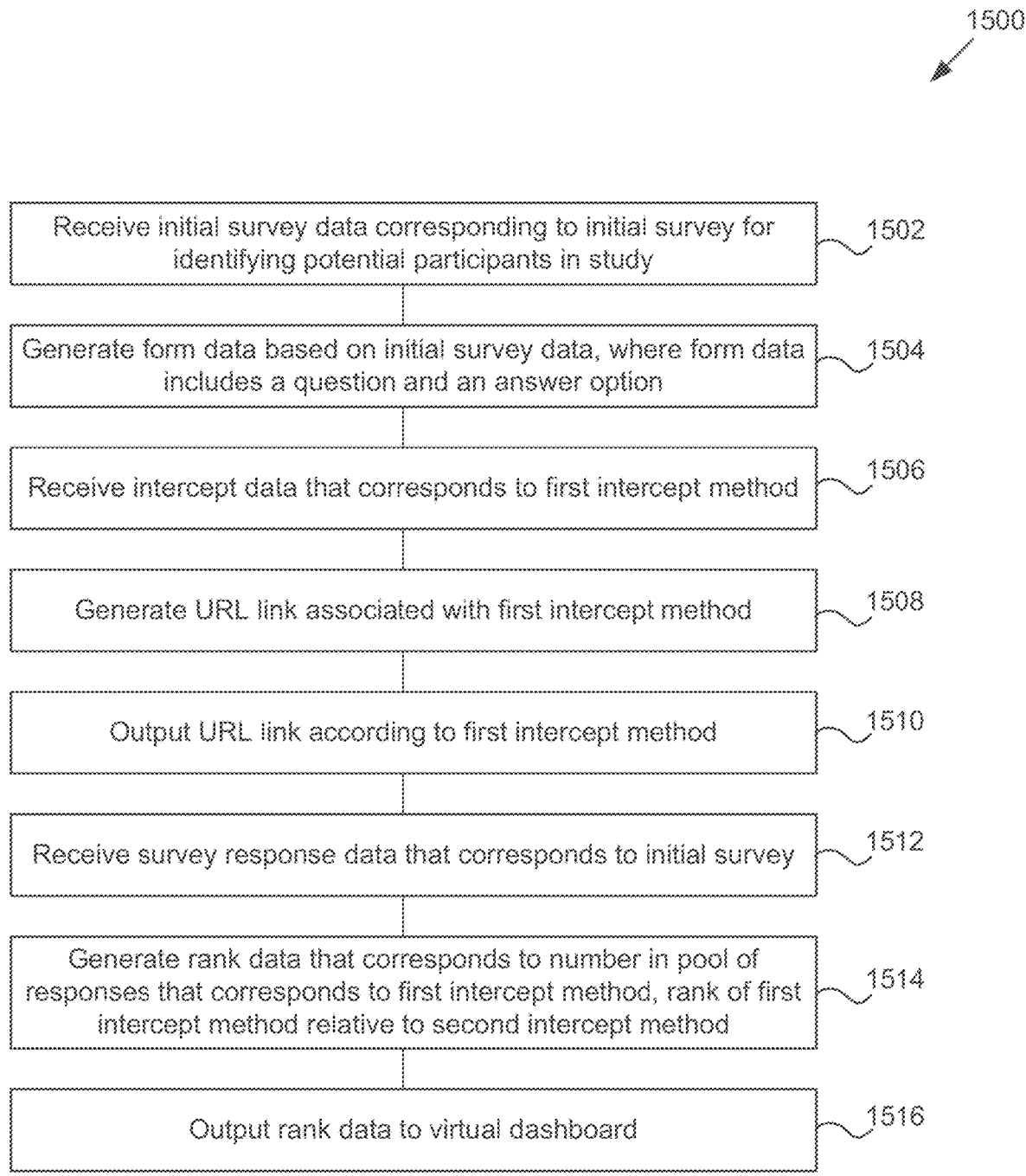
FIG. 15 illustrates a method for intercepting potential participants in the research study, according to an embodiment.

FIG. 15 illustrates a method 1500 for intercepting potential participants in the research study, according to an embodiment. The researcher may use the virtual dashboard to generate and/or monitor screener tools and/or modes for intercepting potential participants in the research study. The virtual dashboard may provide a centralized location for the researcher to manage the lifecycle of the research study, from identifying potential participants to generating study results. The study may start by generating intercepts and screener questions in the virtual dashboard.

The method 1500 may be executed by an intercept server configured to execute the elements of the method 1500 (e.g. the intercept server 134). The method 1500 may include receiving initial survey data (block 1502). The initial survey data may correspond to an initial survey for identifying potential participants for the research study. An individual potential participant that completes the initial survey may be added to the pool of participants. The method 1500 may include, in response to receiving the initial survey data, generating form data (block 1504). The form data may correspond to a survey form that includes a question and a potential answer. The potential answer may include one or more answer selections associated with the question (e.g. Q: What is your favorite TV show?; A: The Office, Friends, or Gilmore Girls). The potential answer may include an answer text input box associated with the question (e.g. Q: How do you feel about CompanyX's services; A: [potential participant inputs text for answer]). An answer may be captured as an audio and/or video message recorded by the participant.

The method 1500 may include receiving intercept data (block 1506). The intercept data may be received from the virtual dashboard (e.g. may be input by the researcher via the researcher virtual dashboard, may be input by the customer via the customer dashboard, and so forth). The intercept data may correspond to an intercept method for intercepting the potential participant in the research study. In general, the intercept method may include "interrupting" a user of a website and/or application. The intercept method may, for example, include a popup on a website. The popup may be, for example, a lightbox, a scroll-in, an information bar, and so forth. The intercept method may include a display ad. The intercept data may correspond to another participant recruitment method, though referred to as "intercept" data. The recruitment method may be an offline method such as a handout or flyer. The recruitment method may be a phone call, video call, and/or text message. The intercept method may be an email blast to email addresses on a mailing list. The intercept method may include a call to action for a recipient of an intercept communication. The intercept method may be a social media post.

The method 1500 may include generating a URL link that directs a user device to the form data (block 1508). The user device may be associated with the individual potential participant. The URL link may be generated in response to receiving the intercept data. The URL link may be associated with the intercept method. For example, if the intercept method is a popup on a website, a virtual button in the popup may redirect a web browser operating on the user device using the URL link to the URL with the form data. As another example, the intercept method may include a text message and the URL link may be included in the text message.

The method 1500 may include outputting the URL link according to the first intercept method (block 1510). At the URL associated with the URL link, the form data may be used in conjunction with user input via a form to generate the survey response data. The survey response data may be transmitted from the form at the URL to the processing device for processing into the research study system, storage at a respondent database, and so forth. The survey response data may indicate the intercept method used to generate the survey response data.

The method 1500 may include receiving the survey response data (block 1512) (e.g., at the processing server). The method 1500 may include generating rank data (block 1514). The rank data may indicate a number of the pool of survey responses obtained via the first intercept method. The processing server may poll the respondent data, which may include the survey response data, to determine the number of the pool of survey responses obtained via different intercept methods (e.g. using logic such as if interceptA=true, varA=varA+1, if intercept=true, varB=varB+1, and so forth). The rank data may rank a first intercept method relative to a second intercept method, a third intercept method, and/or a fourth intercept method, and so forth. The method 1500 may include outputting, to the virtual dashboard, the rank data (block 1516). The researcher may be able to determine the most effective intercept method based on the rank data.

Figure 16:
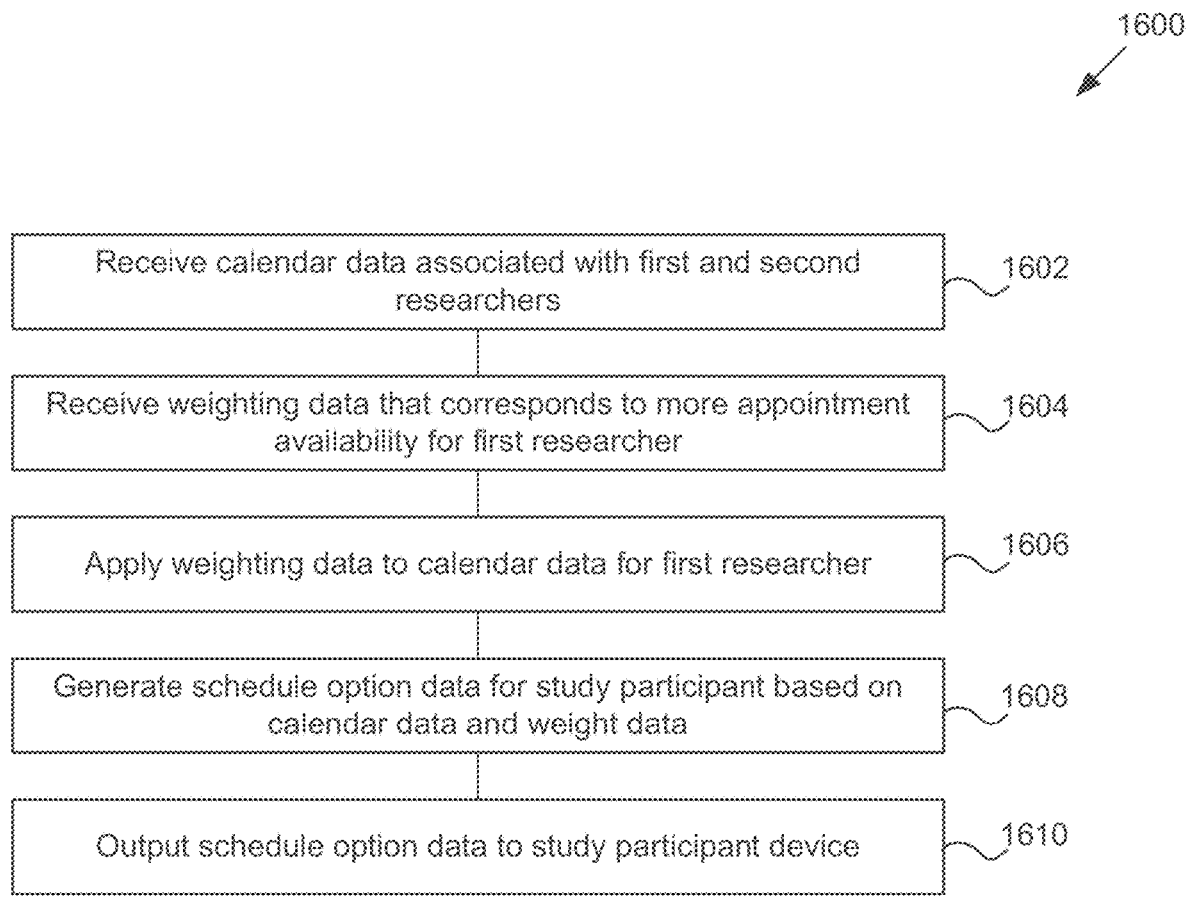
FIG. 16 illustrates a method for weighting calendar data, according to an embodiment.

FIG. 16 illustrates a method 1600 for weighting calendar data, according to an embodiment. A research study may include two or more researchers. For example, one researcher may be a primary researcher and another researcher may be assisting the primary researcher. The additional researcher may assist by providing additional scheduling bandwidth for appointments. However, when possible, it may be preferable for participants to be interviewed by the primary researcher. The method 1600 may enable researchers to have a large degree of control over how many appointments each researcher conducts.

The method 1600 may be executed by a scheduling server configured to execute the elements of the method 1600 (e.g. the scheduling server 122). The method 1600 may include receiving first calendar data associated with a first researcher and receiving second calendar data associated with a second researcher (block 1602). The method 1600 may include receiving weighting data (block 1604). The weighting data may correspond to more appointment availability for the first researcher than the second researcher. The weighting data may correspond to the first researcher having more time in their calendar than the second researcher. The weighting data may correspond to a preference for assigning more appointments to the first researcher than the second researcher regardless the time available in the first researcher's calendar and/or the second researcher's calendar. For example, the weighting data may indicate the first researcher should be assigned up to ten appointments and the second researcher should be assigned up to two appointments. The weighting data may indicate priority for scheduling appointments for the first researcher over the second researcher. The method 1600 may include applying the weighting data to the first calendar data (block 1606).

The method 1600 may include generating schedule option data based on the first calendar data, the second calendar data, and the weighting data (block 1608). The schedule option data may correspond to scheduling options for a potential participant to schedule an appointment with the first researcher or the second researcher. The schedule option data may include a selection of which researcher to meet. The researcher selection may correspond to selection of the first researcher and not the second researcher for the appointment. The researcher selection may correspond to selection of the second researcher and not the first researcher for the appointment. The researcher selection may include selection of the first researcher and the second researcher for the appointment. The researcher selection may include selection of the first researcher or the second researcher.

The schedule option data may include a selection of appointments based on the researcher selection. The appointment selection may include a first set of appointments that corresponds to available appointments with the first researcher. The appointment selection may include a second set of appointments that corresponds to available appointments with the second researcher. The appointment selection may include a third set of appointments that includes the first set of appointments and the second set of appointments. The schedule option data may include a selection of appointments based on a particular time. The schedule option data may include a selection of appointments based on a particular researcher and a particular time.

The schedule option data may reflect the weighting data. For example, the weighting data may indicate the first researcher should have more appointments than the second researcher. The weighting data may be applied to the first calendar data associated with the first researcher so that the first set of appointments includes a greater number of appointments than the second set of appointments (i.e. the schedule option data may reflect that the first researcher has more availability than the second researcher). The weighting data may be applied to the second calendar data associated with the second researcher so that the number of appointments for the second researcher that are included in the schedule option data is less than the number of appointments for the first researcher.

The method 1600 may include outputting the schedule option data to a device associated with a potential participant and/or current participant in the research study (block 1610). The schedule option data may, for example, be output to the participant virtual dashboard. The schedule option data may be output to an email service. The schedule option data may be output to a text messaging service. The schedule option data may be output to an automated phone calling service. The schedule option data may be output to a printer, which may print a human-readable form of the schedule option data to a physical sheet of paper. The sheet of paper may be mailed to the participant. The schedule option data may be output via a popup and/or display ad on a website. The schedule option data may be synchronized with electronic and/or online calendar data such as Google® Calendar, iCal®, Office 365® Calendar, a smartphone-based calendar, and so forth.

Figure 17:
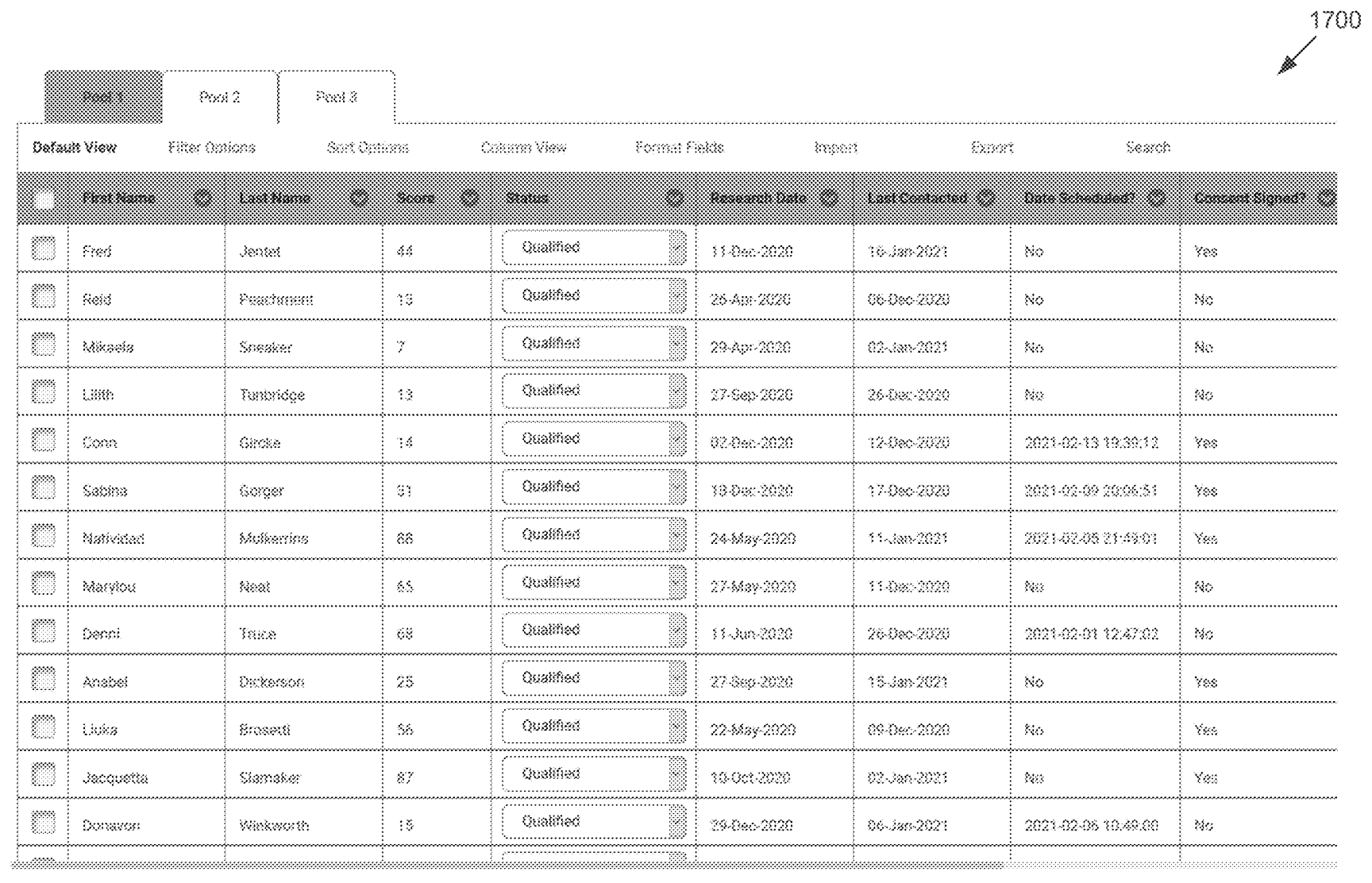

FIG. 17 illustrates an example output 1700 of the research study system 100, according to an embodiment. The research study system 100 may enable a researcher, collaborator, and/or customer to view and/or sort study participants. In various implementations, the output 1700 may be in tabular format. The output 1700 may be in a graphical format. The output 1700 may show study participants in different pools. The different pools may correspond to different research studies or different subsets of participants for the same research study. The different pools may correspond to different segments and/or subsegments. The output 1700 may be indicative of various information about an individual participant and/or a set of participants. For example, the output 1700 may be a graphical display of participants' names, scores, statuses, dates contacted, dates interviewed, whether the participants have signed consent forms, whether participants have been scheduled for interviews, and so forth.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods, and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions, and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements, and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:

1. A system, comprising:
a processing server instantiated on a cloud-based processing device, the processing server configured to:
receive survey response data that corresponds to an answer by an individual research subject to an individual survey question, wherein the survey response data is received from:
a first instance of a researcher virtual dashboard running on a first researcher device;
a research subject virtual dashboard running on a research subject device, the research subject device associated with the individual research subject; or
a customer virtual dashboard running on a customer device, the customer device associated with a customer requesting a research study;
store, in a response database, the survey response data as part of respondent data that corresponds to a pool of survey responses by a pool of research subjects;
receive, from the customer virtual dashboard, rubric data that corresponds to a rubric for scoring the answer to the individual survey question by the individual research subject;
score, using the rubric data, the respondent data that comprises the survey response data to obtain scored response data, wherein the scored response data indicates a score for the individual research subject based on the rubric;
store, in the response database, the scored response data;
receive, from the first instance of the researcher virtual dashboard, filtering response data indicative of a response score to identify one or more preferred research subjects or advance the individual research subject in the research study;
receive, from the first instance of the researcher virtual dashboard, profile data indicative of a preferred ratio for desirable responses, the profile data corresponding to one or more user inputs;

automatically generate a preferred segment based on preferred ratio of desirable responses;

in response to the scored response data corresponding to a minimum score, store, in a segment database, the survey response data, wherein the segment database further stores a subset of the pool of survey responses corresponding to a subset of the pool of research subjects; and output the survey response data to:
the first instance of the researcher virtual dashboard;
the research subject virtual dashboard; or
the customer virtual dashboard;

a scheduling server instantiated on the cloud-based processing device, the scheduling server configured to:
receive invite data that corresponds to a number of potential subjects to invite to advance in the research study, wherein the potential subjects are drawn from the segment database;

generate invite communication data that corresponds to a communication designated for the potential subjects inviting the potential subjects to participate in the research study;

receive schedule goal data that corresponds to a number of interviews to schedule with the potential subjects, wherein the number of interviews to schedule, as indicated by the schedule goal data is less than the number of potential subjects to invite, as indicated by the invite data;

receive schedule data that corresponds to scheduled interviews with at least a portion of the potential subjects, wherein the scheduled interviews are reflected in calendar data associated with one or more interviewing researchers;

receive interview goal data that corresponds to a goal for a number of interviews to actually hold with the potential subjects, wherein an individual interview comprises a live communication between an individual study subject and the one or more interviewing researchers, wherein the goal for the number of interviews to actually hold, as indicated by the interview goal data, is less than the number of interviews to schedule, as indicated by the schedule goal data;

receive confirmation data that corresponds to interviews actually held with study subjects, wherein the confirmation data is associated with an input received via the first instance of the researcher virtual dashboard that indicates whether the individual study subject participated in a scheduled interview with the one or more interviewing researchers;

determine, based on the confirmation data and the interview goal data, whether the goal was met;

in response to the confirmation data indicating the goal was met, generate cancelation data that corresponds to:
a message informing remaining potential subjects associated with the interview goal data that their participation in the research study is not needed, wherein the scheduling server is further configured to output, to the research subject virtual dashboard, the cancelation data; and remaining interviews with the remaining potential subjects being removed from the calendar data, wherein the scheduling server is further configured to edit the calendar data to remove the remaining interviews;

in response to the confirmation data indicating the goal was not met, generate additional invite data that corresponds to inviting additional potential subjects to participate in the research study, wherein the additional potential subject is invited by at least one of a dashboard notification on the research subject virtual dashboard, a screener survey on a website, an automated phone call, an in-person phone call, a video call, a text message, an instant message, and an email; and output, to one or more additional devices associated with the additional potential subjects, the additional invite data; and a collaboration server instantiated on the cloud-based processing device, the collaboration server configured to:
receive vote data that corresponds to a vote on whether to include the individual research subject in the segment database, wherein the vote data assists in determining whether the survey response data is included in the segment database;

in response to the vote data indicating the individual research subject should not be included in the segment database, exclude the survey response data from the segment database; and in response to the vote data indicating the individual research subject should be included in the segment database, include the survey response data in the segment database.

2. The system of claim 1, further comprising a document server instantiated on the cloud-based processing device, the document server configured to:
generate, for display by the research subject virtual dashboard, consent form data that corresponds to a consent form to be completed by the individual research subject, wherein:
the consent form data is generated automatically based on a consent form template stored in a consent form database; or
the consent form data is generated in response to manual input received from the customer virtual dashboard or the first instance of the researcher virtual dashboard;

output, to the research subject virtual dashboard, the consent form data;

receive, from the research subject virtual dashboard, acknowledgment data that corresponds to the consent form being completed by the individual research subject; and store, in an acknowledgment database or the segment database, the acknowledgment data.

3. The system of claim 1, further comprising a payment server instantiated on the cloud-based processing device, the payment server configured to:
receive completion data that corresponds to the individual research subject completing the research study, wherein the completion data is:
received from the first instance of the researcher virtual dashboard;
received from the research subject virtual dashboard;
received from the customer virtual dashboard; or
generated automatically by the processing server in response to the processing server receiving a notification of the individual research subject completing the research study;

determine payment data associated with the individual research subject and the research study, wherein the payment data corresponds to payment to the individual research subject for completing the research study;

output, to the research subject virtual dashboard, the payment data, wherein the research subject virtual dashboard is configured to display a payment receipt option to the individual research subject;

receive, from the research subject virtual dashboard, selection data that corresponds to the payment receipt option being selected by the individual research subject; and output, to a payment device corresponding to the selection data, the payment data, wherein the payment device delivers the payment to the individual research subject according to the payment receipt option selected by the individual research subject.

4. The system of claim 1, further comprising a communication server instantiated on the cloud-based processing device, the communication server configured to:

receive, from a first dashboard running on a first device, communication data that corresponds to a communication designated for another system user, wherein:
the first dashboard comprises:
the first instance of the researcher virtual dashboard;
a second instance of the researcher virtual dashboard running on a second researcher device;
the research subject virtual dashboard; or
the customer virtual dashboard; and
the other system user comprises:
a first researcher associated with the first instance of the researcher virtual dashboard;
a second researcher associated with the second instance of the researcher virtual dashboard;
the individual research subject; or
the customer;

receive, from the first dashboard, delivery method data that corresponds to a delivery method for the communication data, wherein the delivery method comprises:
a dashboard message;
an instant message;
an email;
a text message;
a phone call;
a video call; or
a paper letter; and output, to a corresponding device that corresponds to the delivery method, the communication data, wherein the corresponding device comprises:
a computer associated with the other system user;
a phone associated with the other system user; or
a printer configured to print the paper letter.

5. The system of claim 4, the communication server further configured to match the communication data with template message data, wherein:
the communication data comprises a selection of a templated message associated with the template message data; and
the communication data output to the corresponding device is the template message data.

6. The system of claim 1, further comprising a survey server instantiated on the cloud -based processing device, the survey server configured to:
receive, from the first instance of the researcher virtual dashboard, secondary survey data that corresponds to a second survey for the subset of the pool of research subjects;
store the secondary survey data;
determine the individual research subject is included in the segment database; and
in response to determining the individual research subject is included in the segment database, output, to the research subject virtual dashboard, the secondary survey data.

7. The system of claim 1, further comprising a survey server instantiated on the cloud -based processing device, the survey server configured to:
receive, from the first instance of the researcher virtual dashboard, secondary survey data that corresponds to a second survey for the subset of the pool of research subjects;
receive, from the first instance of the researcher virtual dashboard, selection data that indicates the individual research subject is selected for the second survey; and
in response to receiving the selection data, output, to the research subject virtual dashboard, the secondary survey data.

8. The system of claim 1, further comprising a filter server instantiated on the cloud -based processing device, the filter server configured to:
store survey-agnostic filtering data that corresponds to a first data filter that is generally applicable to a variety of surveys;
store survey-specific filtering data that corresponds to a second data filter that is specifically applicable to an individual survey;
receive, from the processing server, a request for the survey-agnostic filtering data or the survey-specific filtering data;
receive, from the processing server, a request for the survey-agnostic filtering data to parse new survey responses and automatically add responses meeting filtering criteria to the segment database; and
output, to the processing server, the survey-agnostic filtering data or the survey specific filtering data, wherein the filtering data received by the processing server is the survey -agnostic filtering data or the survey specific filtering data.

9. The system of claim 1, wherein:
the response database comprises a relational database;
the survey response data comprises unstructured data imported from an external database; and
the processing server is further configured to:
parse the unstructured data according to response type, wherein the parsing organizes the unstructured data into structured data; and
output, to the response database, the structured data.

10. A system, comprising:
a processing server instantiated on a processing device, the processing server configured to:
receive survey response data that corresponds to an answer by an individual research subject to an individual survey question;
store, in a response database, the survey response data as part of respondent data that corresponds to a pool of survey responses by a pool of research subjects;
receive rubric data that corresponds to a rubric for scoring the answer by the individual research subject to the individual survey question;
score, using the rubric data, the respondent data that comprises the survey response data to obtain scored response data;

store, in the response database, the scored response data, wherein the scored response data indicates a score for the individual research subject based on the rubric;
receive filtering response data that corresponds to a minimum score for advancing the individual research subject in a research study;
in response to the scored response data corresponding to the minimum score, storing, in a segment database, the survey response data that corresponds to the answer by the individual research subject; and
output, to a virtual dashboard, the survey response data;
a collaboration server instantiated on the processing device, the collaboration server configured to receive vote data that corresponds to votes by one or more collaborators on whether to include the individual research subject in the segment database, wherein the vote data assists in determining whether the survey response data is included in the segment database, the processing server being further configured to:
in response to the vote data indicating the individual research subject should not be included in the segment database, exclude the survey response data from the segment database; or
in response to the vote data indicating the individual research subject should be included in the segment database, include the survey response data in the segment database; and
a scheduling server instantiated on the processing device, the scheduling server configured to:
receive interview goal data that corresponds to a goal for a number of interviews to actually hold with potential subjects for the research study, wherein the potential subjects are drawn from the segment database;
determine, based on the interview goal data, schedule goal data that corresponds to a number of interviews to schedule with the potential subjects, wherein the number of interviews to schedule is greater than the number of interviews to actually hold;
determine, based on the schedule goal data, invite data that corresponds to a number of the potential subjects to invite to participate in the research study, wherein the number of the potential subjects to invite to participate in the research study is greater than the number of interviews to schedule; and
output, to a potential participant device and based on the invite data, invitation data that corresponds to an invitation for an individual potential participant to schedule an appointment with an individual researcher.

11. The system of claim 10, the scheduling server further configured to:
receive confirmation data that corresponds to interviews actually held with study subjects;
determine, based on the confirmation data and the interview goal data, whether the goal was met;
in response to the confirmation data indicating the goal was met, generate cancelation data that corresponds to remaining interviews with remaining potential subjects being removed from calendar data associated with an interviewing researcher;
in response to the confirmation data indicating the goal was not met, generate additional invitation data that corresponds to inviting additional potential subjects to participate in the research study; and output, to one or more additional devices for communicating with the additional potential subjects, the additional invitation data.

12. The system of claim 10, wherein:
the individual survey question further comprises:
a first possible answer; and
a second possible answer; and
to score the respondent data, the processing server is further configured to:
apply a first score to the survey response data in response to the survey response data indicating the first possible answer was selected; and
apply a second score to the survey response data in response to the survey response data indicating the second possible answer was selected.

13. The system of claim 10, further comprising an intercept server instantiated on the processing device, the intercept server configured to:
receive initial survey data that corresponds to an initial survey to identify potential participants for the research study, wherein an individual potential participant that completes the initial survey is added to the pool of research subjects;
in response to receiving the initial survey data, generate form data that corresponds to:
a question; and
a potential answer, wherein the potential answer comprises:
one or more answer selections associated with the question; or
an answer text input box associated with the question;
receive, from the virtual dashboard, intercept data that corresponds to a first intercept method for intercepting the potential participant in the research study, wherein the virtual dashboard is associated with:
an individual researcher conducting the research study; or
a customer that requested the research study; and
in response to receiving the intercept data, generating a uniform resource location (URL) link that directs a user device to the form data, wherein:
the user device is associated with the individual potential participant;
the URL link is associated with the first intercept method;
the survey response data is received from a URL associated with the URL link in response to the potential answer being input in the form data via the user device; and
the survey response data indicates the intercept method.

14. The system of claim 13, the intercept server further configured to:
generate rank data that indicates a number of the pool of survey responses obtained via the first intercept method, wherein the rank data ranks the first intercept method relative to a second intercept method; and
output, to the virtual dashboard, the rank data.

15. A system, comprising:
a processing server instantiated on a processing device, the processing server configured to:
receive survey response data that corresponds to an answer by an individual research subject to an individual survey question;
store, in a response database, the survey response data as part of respondent data that corresponds to a pool of survey responses by a pool of research subjects;

receive rubric data that corresponds to a rubric for scoring the answer by the individual research subject to the individual survey question;

score, using the rubric data, the respondent data that comprises the survey response data to obtain scored response data, wherein the scored response data indicates a score for the individual research subject based on the rubric;

store, in the response database, the scored response data;

receive filtering response data that corresponds to a minimum score for advancing the individual research subject in a research study;

in response to the scored response data corresponding to the minimum score, storing, in a segment database, the survey response data that corresponds to the answer by the individual research subject; and output, to a virtual dashboard, the survey response data;

a scheduling server instantiated on the processing device, the scheduling server configured to:

receive invite data that corresponds to a number of potential subjects to invite to participate in the research study, wherein the potential subjects are drawn from the segment database;

receive schedule goal data that corresponds to a number of interviews to schedule with the potential subjects, wherein the number of interviews to schedule, as indicated by the schedule goal data, is less than the number of potential subjects to invite, as indicated by the invite data;

receive interview goal data that corresponds to a goal for a number of interviews to actually hold with the potential subjects, wherein the goal for the number of interviews to actually hold, as indicated by the interview data, is less than the number of interviews to schedule, as indicated by the schedule goal data;

receive confirmation data that corresponds to interviews actually held with study subjects, wherein an individual interview comprises a live communication between an individual study subject and one or more interviewing researchers, and wherein the confirmation data is associated with an input at a researcher device that indicates whether the individual study subject participated in a scheduled interview with the one or more interviewing researchers;

determine, based on the confirmation data and the interview goal data, whether the goal was met;

in response to the confirmation data indicating the goal was met, generate cancelation data that corresponds to remaining interviews with the remaining potential subjects being removed from calendar data associated with the one or more interviewing researchers, wherein the cancelation data corresponds to one or more of a message informing a remaining potential participant that their participation in the research study is not needed and a calendar update removing the remaining interviews from the calendar data associated with the one or more interviewing researchers, and wherein the scheduling server is further configured to edit the calendar data to remove the remaining interviews;

in response to the confirmation data indicating the goal was not met, generate additional invite data that corresponds to:

inviting an additional potential subject to participate in the research study; or inviting a waitlist potential subject to participate in the research study, wherein the additional potential subject or the waitlist potential subject is invited by at least one of a dashboard notification on a research subject dashboard, a screener survey on a website, an automated phone call, an in-person phone call, a video call, a text message, an instant message, and an email; and output, to a user device associated with the additional potential subject or the waitlist potential subject, the additional invite data; and a collaboration server instantiated on the processing device, the collaboration server configured to:

receive vote data that corresponds to a vote on whether to include the individual research subject in the segment database, wherein the vote data assists in determining whether the survey response data is included in the segment database;

in response to the vote data indicating the individual research subject should not be included in the segment database, exclude the survey response data from the segment database; and in response to the vote data indicating the individual research subject should be included in the segment database, include the survey response data in the segment database.

16. The system of claim 15, the scheduling server further configured to output, to a potential participant device, schedule option data that corresponds to scheduling options for an individual potential participant, wherein the scheduling options comprise:

a researcher selection that corresponds to:
selection of a first researcher and not a second researcher;
selection of the second researcher and not the first researcher; or
selection of the first researcher and the second researcher; and an appointment selection based on the researcher selection, wherein the appointment selection comprises:
a first set of appointments that corresponds to available appointments with the first researcher;
a second set of appointments that corresponds to available appointments with the second researcher; or
a third set of appointments that includes the first set of appointments and the second set of appointments.

17. The system of claim 16, the scheduling server further configured to apply weighting data to calendar data associated with the first researcher, wherein the weighting data causes the first set of appointments to include a greater number of appointment slots than the second set of appointments.

* * * * *